(12) United States Patent
Toliusis

(10) Patent No.: US 8,210,207 B2
(45) Date of Patent: Jul. 3, 2012

(54) DIRECTLY PILOTED VALVE ASSEMBLY

(76) Inventor: Vytautas Joseph Toliusis, Paw Paw, MI (US)

( * ) Notice: Subject to any disclaimer, the term of this patent is extended or adjusted under 35 U.S.C. 154(b) by 140 days.

(21) Appl. No.: 12/758,277

(22) Filed: Apr. 12, 2010

(65) Prior Publication Data

US 2010/0218836 A1 Sep. 2, 2010

Related U.S. Application Data

(63) Continuation of application No. PCT/US2009/058971, filed on Sep. 30, 2009.

(60) Provisional application No. 60/102,427, filed on Oct. 3, 2008.

(51) Int. Cl.
*F16K 11/07* (2006.01)

(52) U.S. Cl. .......... 137/625.68; 137/625.65; 137/625.69

(58) Field of Classification Search ............... 137/625.6, 137/625.63, 625.64, 625.68, 625.69, 625.65
See application file for complete search history.

(56) References Cited

U.S. PATENT DOCUMENTS

| 4,333,387 | A * | 6/1982 | Seitz .................................. 91/1 |
| 6,543,481 | B2 * | 4/2003 | Neff et al. ................ 137/625.63 |
| 2010/0148098 | A1 * | 6/2010 | Toliusis .................... 251/30.01 |

* cited by examiner

Primary Examiner — Craig Schneider
(74) Attorney, Agent, or Firm — King & Schickli, PLLC

(57) ABSTRACT

A directly piloted valve assembly has a valve body including a bore, at least one inlet port, at least one outlet port and at least one exhaust port or second outlet port wherein the ports are all in fluid communication with the bore. A spool is received in the bore. The spool includes a wall defining a lumen. An actuator is received in the lumen. The actuator includes a shuttle seal channel. A shuttle seal is received in the shuttle seal channel. A solenoid is connected to the valve body. The wall of the spool includes at least one pilot hole in fluid communication with the lumen defined by the spool and the bore of the valve body.

50 Claims, 17 Drawing Sheets

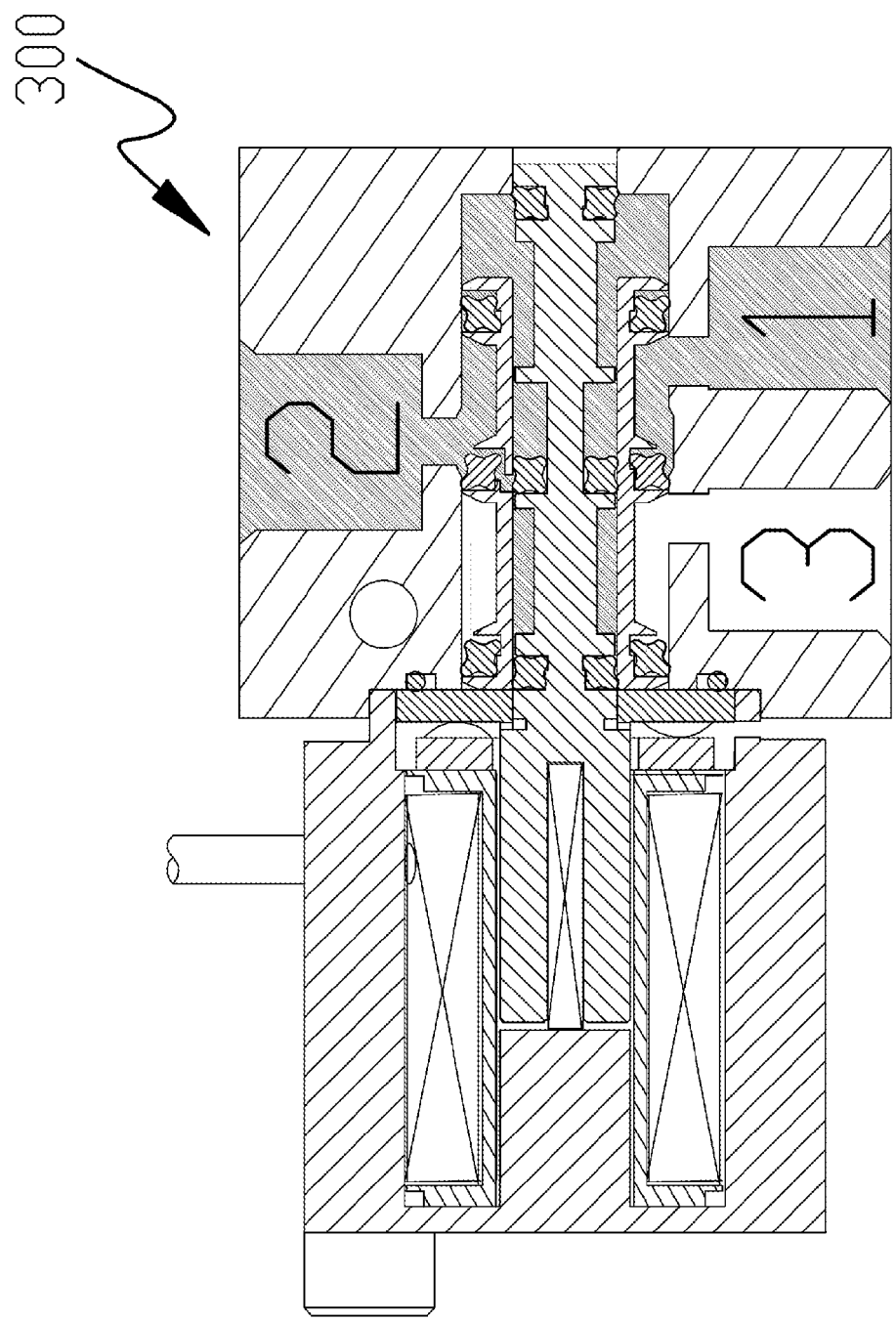

DIRECTLY PILOTED VALVE ASSEMBLY

CROSS REFERENCE TO RELATED APPLICATIONS

This application is a continuation of application PCT/U.S. Ser. No. 09/58971 filed on 30 Sep. 2009 the full disclosure of which is incorporated herein by reference and also claims priority to U.S. Provisional Patent application Ser. No. 61,102,427 filed on 3 Oct. 2008.

BACKGROUND OF THE INVENTION

The present invention relates generally to pneumatic valves and, more particularly, to a directly piloted valve assembly.

Generally speaking there are two main valve types, direct acting designs and piloted designs. With a direct acting solenoid design the movable armature is in direct contact with and directly pushes or pulls the main valve shifting element, typically called the spool or stem. After shifting, the spool or stem is returned to an original position by the force of a return spring or, in the case of a double solenoid valve, by a second solenoid. Sealing elements on the stem are typically of the poppet configuration. Poppet seats allow for a shorter stroke of the spool for a given amount of flow gap between the poppet and seat. Poppet design consists of elastomeric sealing material, the poppet, formed about the circumference of a movable spool. The poppet makes a seal when it is forced against a relatively sharp edge within the valve body.

One significant limitation of the direct acting poppet design is the requirement of a short spool stroke, and the tight tolerances involved in manufacturing a valve body and spool to accommodate a short spool stroke. The short spool stroke is needed in order to keep solenoid power as low as possible. Unfortunately, the short spool stroke increases the difficulty in the manufacturing process. Each valve is assembled with its own unique positioning of poppets on the spool. This requirement is most demanding for the 4-way valve because two (2) poppets must seal at the same time. Sealing both poppets at the same time is made more difficult because one poppet seals with pressure and the other seals against pressure. One poppet is forced against the sealing diameter by pressure and the other is being forced away from the sealing diameter. In addition to the tight positional tolerances of mating components, the seats in the body must be precisely machined and aligned. The seat finish has to be smooth, with no dings dents or rough machine marks, and the radius of the seat has to be within a tight tolerance, typically around 0.007/ 0.003 inches. If the seat is too large, the valve will not seal at high pressure and if the seat is too small (sharp), the poppet will be cut, causing an early failure.

In addition to the manufacturing issues, the need for a low-friction, short spool stroke essentially prevents the use of a sliding seal on the spool. A sliding seal would require a much longer stroke of the spool than a poppet seal, because the sealing element in a sliding seal design has to move far enough to create the flow gap in addition to the distance moved to exit and enter the sealing bore. Sliding seals that enter and exit a bore are typically not used with the direct acting design because the long stroke and high seal friction forces would require high solenoid power levels. There are designs employing close metal to metal fits to achieve the sealing function, this results in low friction forces. The negative aspect of this type of design is that there is always some leaking. The sliding metal to metal elements must have a clearance and so the always present clearance gap has an always present leak.

Despite the noted disadvantages, there are a number of advantages to direct acting designs, including: (1) there is no minimum operating pressure limitation; (2) typically, these designs will function with both vacuum and pressure; and (3) the total part count is low (i.e. less than the piloted design described below). Disadvantages of the direct acting design include: (1) relatively low ratio of flow to solenoid power (i.e., a relatively high wattage input is required for the solenoid to control a relatively low flow capacity); (2) the relatively high cost of manufacturing parts to tight tolerances or making assembly settings to tight positional tolerances; (3) for the custom assembled version, parts can not be changed or replaced (product is not repairable and typically the valve coil can not be changed when a different voltage is needed); and (4) for products machined to tight tolerances only, not needing custom assembly, coils can be changed but the spool cannot be changed because insertion of the spool requires special tooling.

The typical piloted valve is really two valves, combining a larger high flow 4-way or 3-way valve body with a smaller 3-way or 4-way valve that is typically attached at one or both ends of the larger body. The smaller valve provides an air pilot signal that acts on a pilot piston of the larger valve to shift a spool. Return of the spool can be accomplished with either air pressure or a return spring or a combination of both. This design results in relatively high flow with lower power consumption than a direct acting valve. Some advantages of piloted design include: (1) the possibility of greater flow through the valve than the direct acting design because the spool stroke is not limited by the power of the solenoid coil; (2) the valve components can be replaced to repair the valve or change the coil voltage; (3) the valve does not require tolerances as tight as those of the direct acting design.

Some disadvantages of piloted design include: (1) the part count is typically higher than in direct acting designs because both a pilot valve and a main valve are required; (2) the final product is larger due to the extra components, and may not be useful in applications requiring a small valve; (3) there is a minimum pilot pressure required for pilot function, around 30 pounds per square inch; (4) piloted designs typically have a slower response time than direct acting designs; (5) piloted designs typically have a more expensive valve body due to requirement of connecting the pilot valve output to the pilot piston and the supply pressure to the return piston. This is most commonly done with cross drillings in the valve body that are plugged with balls or synthetic elastomer seals; (6) piloted designs cannot be used with a vacuum unless a separate pilot pressure is supplied; (7) different valve bodies must be machined for different pilot port sources; (8) the power of the 3-way pilot valve is determined by orifice size of the pilot valve. Pilot valves have very low $C_v$ (flow capacity) values because the forces of the solenoid armature and the return spring have to be greater than the product of the orifice size and pressure (area X pressure), this is because the typical 3-way pilot valve is of the unbalanced poppet design therefore higher pressures require higher forces from the armature. The small orifice size allows for lower coil power but the trade off is slower main valve response due to reduced flow to and exhaust from pilot pistons; (9) the spool requires 6 seals to prevent extrusion (i.e., deformation of the seal into the hole that is being sealed).

SUMMARY OF THE INVENTION

The present invention provides a valve assembly that is directly piloted, such that it includes advantages of a piloted valve design and a direct acting design in a relatively small package, with fewer parts than either designs. In one embodiment, the directly piloted valve assembly includes a valve body, a spool received within the valve body, and an actuator received within the spool. The actuator includes a shuttle seal channel, and a shuttle seal that is capable of shifting between the ends of the channel. When the actuator is moved by a solenoid or return spring, the fluid pressures acting on the spool and actuator shuttle seal are changed, forcing the shuttle seal to move from one end of the shuttle seal channel to the other and the spool to shift from a first position to a second position, simultaneously changing the outputs of the valve.

In one embodiment, the valve body defines a bore and includes an inlet port, at least one outlet port, and an exhaust port. The inlet port, outlet port and the exhaust port are in fluid communication with the bore. The spool is received in the bore and includes a wall defining a lumen. The spool further includes at least one pilot hole extending through the wall to the lumen. The spool is movable within the bore between a first spool position in which the inlet port is in fluid communication with the outlet port and a second spool position in which the inlet port is not in fluid communication with the outlet port. The actuator extends through said lumen, and defines a shuttle seal channel. A solenoid is connected to the valve body. The solenoid is capable of moving the actuator between a first actuator position and a second actuator position.

The shuttle seal is included within the shuttle seal channel and is movable between a first position at a first end of the shuttle seal channel and a second position at a second end of the shuttle seal channel. The at least one pilot hole is in fluid communication with the shuttle seal channel when the actuator is in the first actuator position and the second actuator position. In addition, the at least one pilot hole is in fluid communication with the shuttle seal channel when the spool is in the first spool position and when the spool is in the second spool position. Actuation of the solenoid moves the actuator from the first position to the second position, which changes the fluid pressure on the shuttle seal and shifts the shuttle seal from its first position to its second position. Movement of the actuator in combination with the shuttle seal movement to its second position shifts the fluid pressure acting on the spool ends, thus moving the spool from its first position to its second position—which changes the fluid flow path through the valve ports, for instance, by changing the fluid communication between the input and a first output port to fluid communication between the input and a second output port.

In one embodiment, the directly piloted valve assembly includes a first actuator seal and a second actuator seal. The first actuator seal seals against the lumen when the spool is in the first spool position, and the second actuator seal seals against the lumen when the spool is in the second spool position. In addition, in one embodiment, the first actuator seal does not seal against the lumen when the spool is in the second position, and the second actuator seal does not seal against the lumen when the spool is in the first spool position.

In another embodiment, the shuttle seal is a quad ring. The quad ring includes an internal groove, and a pair of lobes that seal against the lumen surfaces of the spool. In one embodiment, the first and second actuator quad ring lobes are disposed about the circumference of the actuator such that at least a portion of the quad ring is stretched and in tension to increase the diameter of that portion of the quad ring. For instance, the actuator may include a groove within which the quad ring is positioned, and the actuator may have a varying diameter within the groove so as to stretch one lobe of the quad ring to a greater diameter than the other lobe of the quad ring. In a more particular embodiment, the diameter of the actuator within the groove is stepped so that it increases in a direction extending away from the center of the actuator, thus increasing the diameter of the one quad ring lobe that is positioned furthest from the actuator shuttle seal channel.

The solenoid actuator/armature in combination with the spool directly creates a pilot function that shifts the spool. This eliminates the need for mounting a separate pilot valve to the body, and eliminates the need for routing the outputs of the separate valve into the body with plugged drillings. Pilot pressure may shift the spool while the opposite end of the spool is open to exhaust to the atmosphere.

Some advantages of directly piloted design include: (1) lower product component costs because pilot function is achieved with the spool and actuator/armature, without a separate pilot valve and pilot end cap; (2) fast valve response because the end of the spool opposite the pilot pressure action end is open to atmosphere, and it is not opposed by the force of a smaller return piston or a return spring. In addition, the pilot force does not have to overcome the seal friction of 2 pilot piston seals; (3) lower assembly cost because parts are assembled as machined, to achievable tolerances and the design does not require custom setting of components; (4) a lower minimum operating pressure because of the spool seal design and because the spool requires only 4 quad ring seals instead of the typical 6 seal spool design. Another contributing factor to low minimum operating pressure is that the pilot signal does not have to work against a return force. Minimum rated pressure will be around 10 psi. The typical piloted valve requires 20 to 40 psi. to function; (5) critical machining tolerances in body and coil holder can be easily maintained by using custom finish form tools. Also the tolerance stack up between critical features is eliminated by using a common plane for positioning critical features of the coil holder and body washer to the body; (6) low solenoid power requirement because actuator/armature stroke is short (0.013 to 0.017 inches) and pneumatic forces acting on actuator/armature are balanced. Pressure does not force actuator in either direction, so effective pilot orifice size is not a limiting factor to keeping coil power low. Pilot function has higher Cv/watts ratio than the typical pilot valve; (7) higher flow is possible than with the typical piloted valve because more of the body length is available for spool stroke due to using only 4 spool seals instead of the typical 6; (8) the same body can be used to supply pilot pressure from different ports by using different spool/actuator pairs (the typical piloted valves requires a different body).

In the following description there is shown and described two current embodiments of the invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

FIG. 10 is a cross sectional view of a three-way, normally open, directly piloted valve assembly constructed in accordance with one embodiment of the present invention.

Reference will now be made in detail to the current embodiments of the invention, examples of which are illustrated in the accompanying drawings.

DETAILED DESCRIPTION OF THE CURRENT EMBODIMENTS OF THE INVENTION

I. Overview

Figure 1:
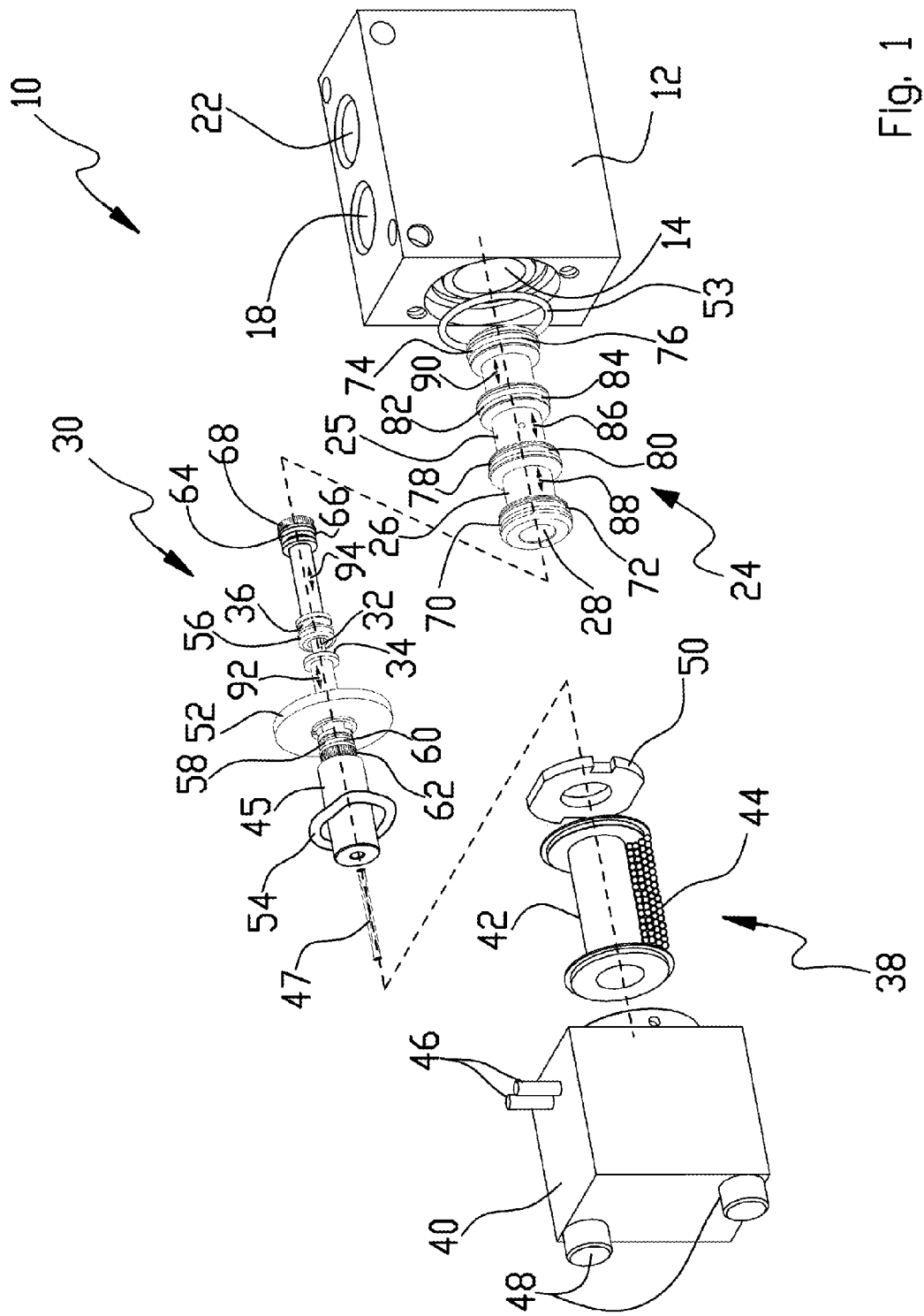
FIG. 1 is an exploded perspective view of the valve assembly according to one embodiment of the present invention.
Figure 2A:
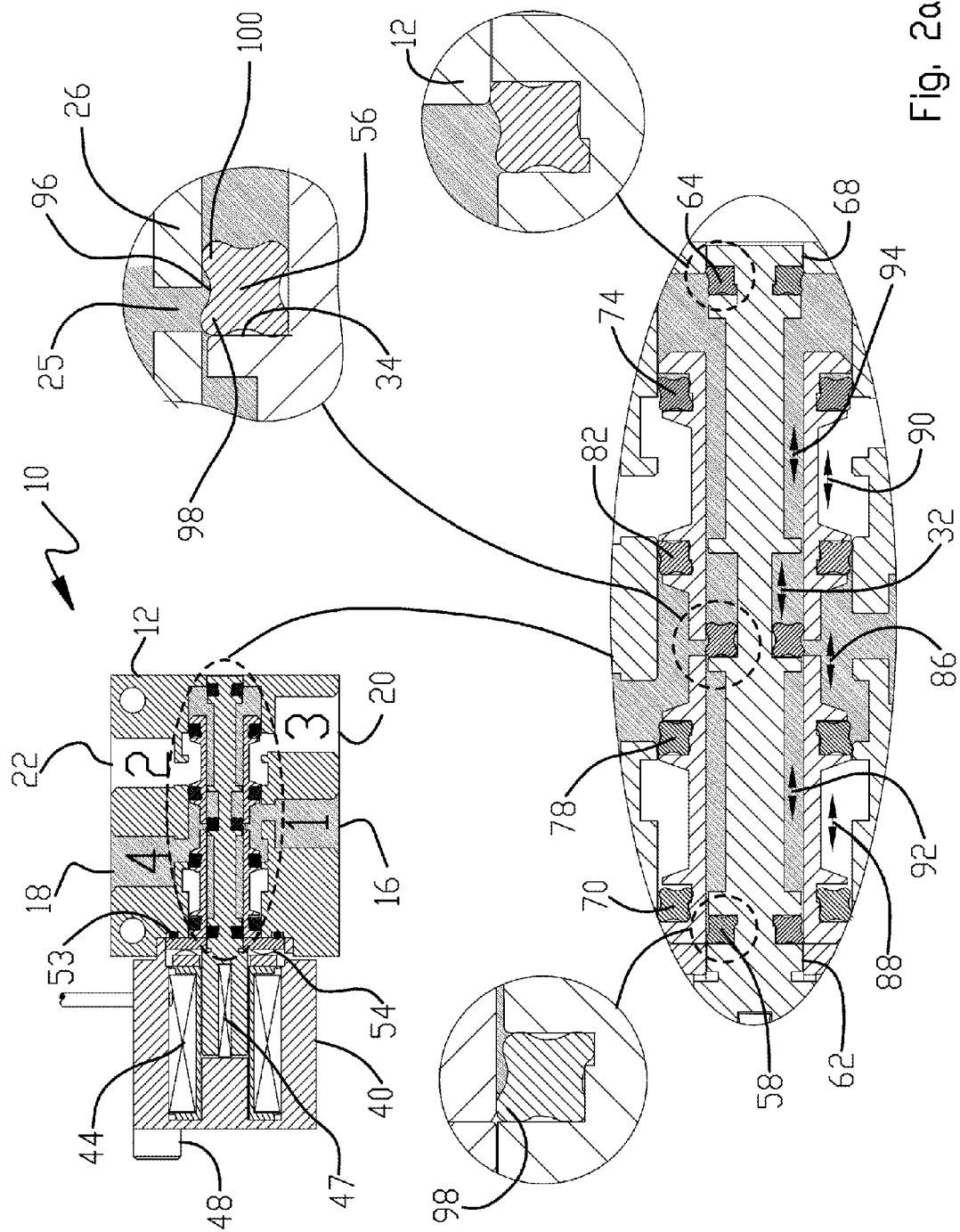
FIG. 2a is a cross sectional view of the valve assembly with the solenoid de-energized and the spool and actuator at the first operating positions, including enlarged views of selected portions of the valve assembly.

Reference is made to FIGS. 1 and 2a generally illustrating a directly piloted valve 10 according to one embodiment of the present invention. As illustrated, the piloted valve 10 generally includes a valve body 12 having a bore 14, a first port 16, a fourth port 18, a third port 20 and a second port 22. Each of the ports 16, 18, 20, 22 is provided with communication with the bore 14.

II. Structure

A spool 24 is received in the bore 14. The spool 24 includes an outer wall 26 defining a lumen 28. A series of pilot holes 25 are provided in the wall 26. The pilot holes 25 provide fluid communication between the bore 14 in the valve body 12 and the lumen 28 in the spool 24.

In the illustrated embodiment, an actuator 30 is received in the lumen 28. The actuator 30 includes a shuttle seal channel 32 having a first shoulder or end 34 and a second shoulder or end 36. A solenoid, generally designated by reference numeral 38, includes a housing 40 for holding a bobbin 42 and windings 44. The solenoid 38 further includes an armature 45 that may be connected to and, in one embodiment, formed as an integral part of the actuator 30. In addition, the solenoid 38 includes the lead wires 46, a return spring 47 and mounting screws 48 for securing the housing 40 of the solenoid to the valve body 12. A coil washer 50, body washer 52, an o-ring 53 and a wave spring 54 ensure proper sealing and positioning between the housing 40 and the valve body 12. The solenoid 38 utilized by the present invention is generally conventional, and the specific arrangement of the solenoid and the connection of the solenoid to the valve body 12 may vary from application to application.

In one embodiment, a shuttle seal 56 is carried on the actuator 30 in the shuttle seal channel 32. The shuttle seal channel 32 may, for example, have a width of between 0.215 inches and about 0.211 inches while the shuttle seal 56 has a width of between 0.057 inches and about 0.063 inches and a ratio of the shuttle seal channel width to the shuttle seal width is generally between about 3.35 and about 3.77. As shown, the shuttle seal 56 is free to move along the actuator 30 within the shuttle seal channel 32 between the first end or shoulder 34 and the second end or shoulder 36.

A first actuator end seal 58 is provided in a first channel 60 on the actuator 30 adjacent a first end 62 of the actuator 30. Similarly, a second actuator end seal 64 is provided in a second channel 66 adjacent a second end 68 of the actuator 30. In one embodiment, the actuator ends 62, 68 include straight knurling, which forms a series of straight grooves about the circumference of the actuator at the ends 62, 68 and enable them to function as piloting guides in a manner that will be described in greater detail below.

A first spool end seal 70 is provided in a channel 72 in the spool 24 adjacent a first end of the spool 24 while a second spool end seal 74 is provided in a channel 76 adjacent a second end of the spool 24. In addition, a first spool intermediate seal 78 is provided in a channel 80 and a second spool intermediate seal 82 is provided in a channel 84 along the spool 24. A first annular groove 86 is provided in the spool 24 between the first and second spool intermediate seals 78, 82. A second annular groove 88 is provided in the spool 24 between the first spool end seal 70 and the first spool intermediate seal 78. Further, a third annular groove 90 is provided between the second spool end seal 74 and the second spool intermediate seal 82.

A fourth annular groove 92 is provided on the actuator 30 between the first actuator end seal 58 and the shuttle seal channel 32. In addition a fifth annular groove 94 is provided on the actuator 30 between the second actuator end seal 64 and the shuttle seal channel 32.

When the actuator 30 is properly positioned in the lumen 28 of the spool 24 and the spool 24 is properly positioned in the bore 14 of the valve body 12, the pilot holes 25 provide direct fluid communication between the first annular groove 86 and the bore 14 and the shuttle seal channel 32 in the lumen 28. Typically, each of the pilot holes 25 has a diameter between 0.031 and about 0.033 inches; however, the diameter may vary from application to application. In one embodiment, anywhere from one to four pilot holes 25 may be provided at angular intervals about the spool 24 (e.g. two pilot holes, 180 degrees apart; or four pilot holes, one every 90 deg.).

As should be appreciated, the actuator 30 is free to shift in the lumen with respect to the spool 24. In one embodiment, the actuator 30 may shift in a stroke having a length L1, between about 0.013 inches and about 0.017 inches. Similarly, the spool 24 is free to move in the bore 14 and, in one embodiment, has a stroke having a length L2, of between about 0.155 inches and about 0.165 inches. Typically the ratio of L2 to L1 is between about 9.1 and about 12.7 although a variety of ratios may be used. Advantageously, the relatively short actuator stroke minimizes the power requirements for the operation of the valve 10 while the relatively long stroke of the spool results in desirable high flow properties.

Figure 2B:
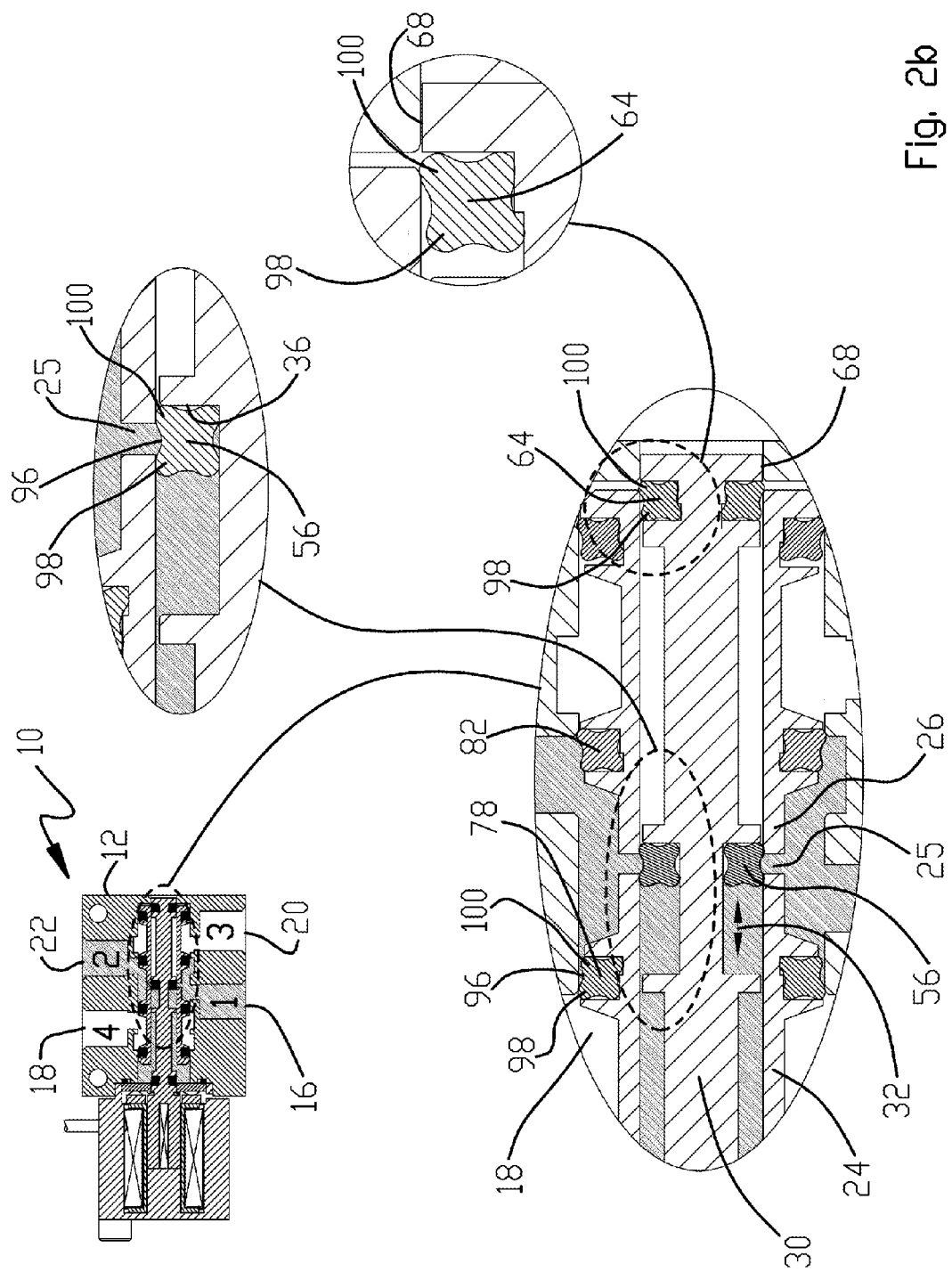
FIG. 2b is a cross sectional view of the valve assembly with the solenoid energized, and the spool at an intermediate position, the actuator at a second operating position, including enlarged views of selected portions of the valve assembly.

As best illustrated in the FIGS. 2a and 2b, in one embodiment, each of the seals 56, 58, 64, 70, 74, 78 and 82 is a quad ring lobe seal that is constructed of a resilient material and includes an annular groove 96 provided between adjacent lobes 98 and 100. As will become apparent in the following description, whether the valve 10 is in the first operating (fully de-energized) position or the second, opposite operating (fully energized) position, the lobes 98 and 100 on the shuttle seal 56 are positioned relative to the pilot holes 25. In one embodiment, the quad ring lobed seals 70, 74, 78 and 82 on the spool 24 and the quad ring lobed seals 58 and 64 on the actuator may be disposed about the circumferences of the spool and actuator respectively such that at least a portion of the quad ring is stretched and in tension. As shown in FIG. 2a, for example, one method for accomplishing this is to vary the diameter of the spool and/or actuator within the groove in which the quad ring is placed. In the illustrated embodiment, the diameter of the groove in which each quad ring 58, 64, 70, 74, 78 and 82 is disposed is stepped, such that is has a first diameter and a second diameter greater than the first diameter. The greater second diameter stretches a portion of the quad ring, including one of the lobes of the quad ring, such that the lobe positioned over the second diameter has a greater diameter than the lobe positioned over the first diameter. As a result, the quad rings on the spool and actuator can be of standard off the shelf sizes, and can still function as if one lobe has a greater diameter than the other. As shown, the stepped or stretched lobe of each quad ring is the lobe that is positioned farther from the center of the actuator or spool respectively.

Although the present invention does not require the use of quad ring lobe seals, numerous benefits result from the use of quad ring lobe seals 56, 58, 64, 70, 74, 78 and 82. More specifically, prior art valve designs typically incorporate o-ring or oval shaped seals. It has been found necessary to provide six seals of the o-ring or oval shape in order to provide a closed cross over design to prevent the extrusion of a seal that could otherwise cause pinching and cutting failure during shifting of the spool. Another design consists of forming and bonding sealing elements onto the spool, allowing for only four seals on the spool. The molded on seal design is seldom used because it requires costly tooling to mold the finished spool and it requires a expensive secondary operation to grind the molded sealing material in order to remove the molding parting line. As only four spool seals are required when utilizing the quad ring lobe seals of the present invention production costs are reduced and a shorter overall spool may be provided with the same or greater flow capability than a valve using six seals on the spool as in the prior art. More specifically, the quad ring lobe seals do not extrude under pressure during shifting of the spool because the portions of the seals that are stretched and under tension are farther from the center of the spool, so that the main body of each the seals is pulled in towards the spool center. The seals are additionally pushed towards the center of the spool because air pressure is forcing the body of the quad ring seal toward the center of the spool, thereby preventing extrusion of the seal into the gap during the shifting of the spool, which could result in cutting or pinching of the seal.

III. Operation

Operation of a first illustrated embodiment of valve 10 will now be described in detail with reference to FIGS. 2a, 2b, 3, 4a, 4b, 5a and 5b FIG. 2a illustrates the valve 10 with the solenoid de-energized (i.e., armature/actuator shifted to the right) and the spool 24 in a first operating position (i.e., shifted to the left). In this position the first or input port 16 is in communication with the fourth or output port 18 while the second port 22 is provided in communication with the third or exhaust port 20. As illustrated, the shuttle seal 56 is at the first end or shoulder 34 of the shuttle seal channel 32 with the lobe 98 of the seal positioned relative to pilot holes 25. The actuator 30 is biased to the right in the drawing by operation of the return spring 47 so that the second actuator end seal 64 seals against the valve body 12 while the first end knurled piloting guide 62 is opened to atmosphere so as to provide for its piloting function.

As should be appreciated from reviewing FIG. 2a, pressurized fluid in the bore 14 flows through the pilot holes 25 past lobe 98 of the shuttle seal 56 but does not flow past the lobe 98 of first actuator end seal 58 which is sealing to the wall of lumen 28. Therefore, volume to the left of shuttle seal 56 is pressurized, but is prevented from flowing to the left end of the spool 24. Since the volume or space in the bore 14 to the right of the shuttle seal 56 is closed to atmosphere by the second end seal 64, volume to the left and to the right of lobe 100 is pressurized, at the same pressure. As a result, lobe 100 of the shuttle seal 56 does not seal and the pressurized fluid also flows to the right of the shuttle seal 56 past the lobe 100 at the surface of lumen 28 to the right end of the bore 14 and ultimately to the right end of the spool 24. Because the pressure to the left and to the right of shuttle seal 56 is the same, shuttle seal 56 does not move, and it stays in its original position. Pressurized fluid to the right of spool 24 forces the spool to the left and holds it in that position.

Figure 3:
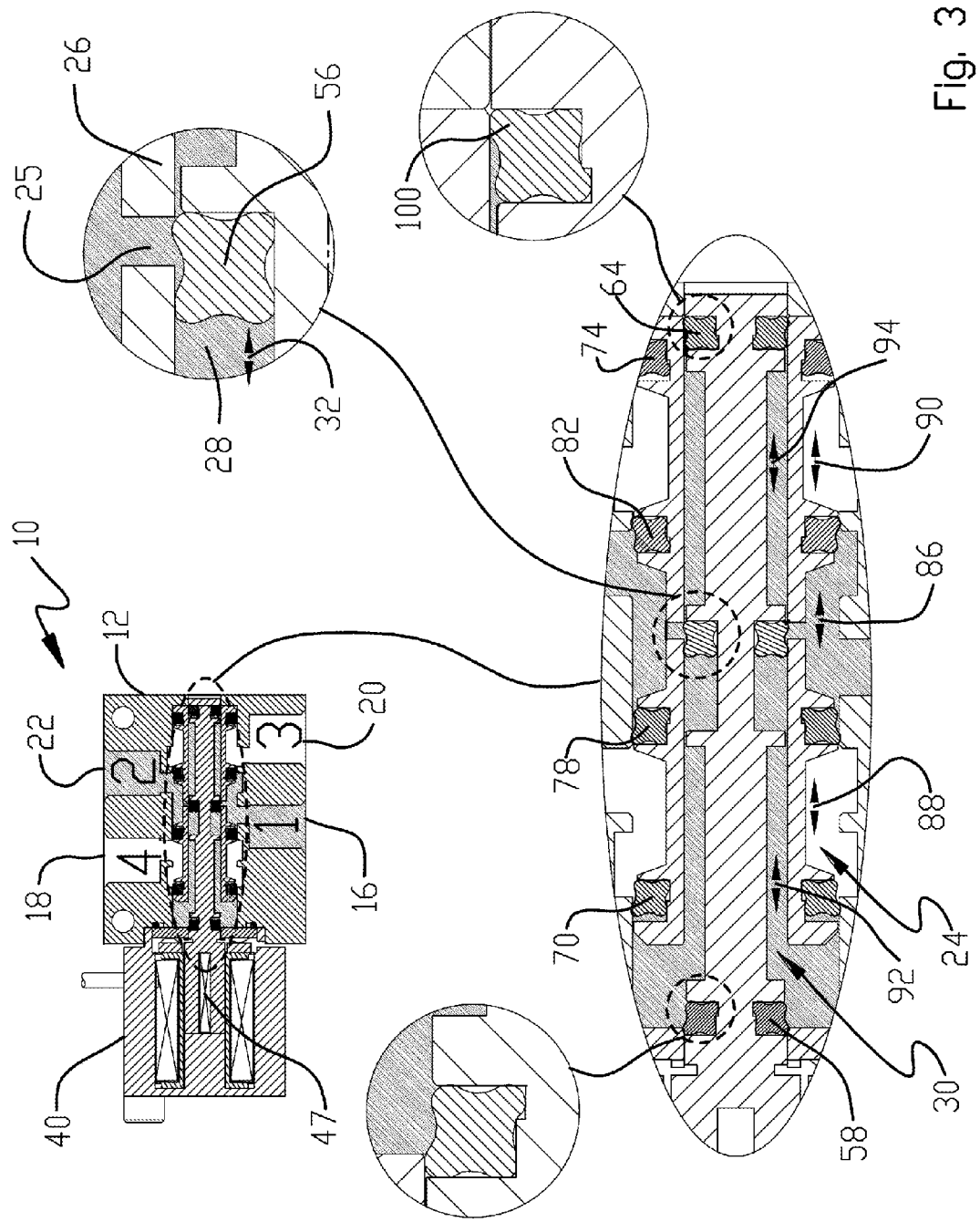
FIG. 3 is a cross sectional view of the valve assembly with the solenoid energized, and the spool and actuator at the second operating positions, including enlarged views of selected portions of the valve assembly.
Figure 4A:
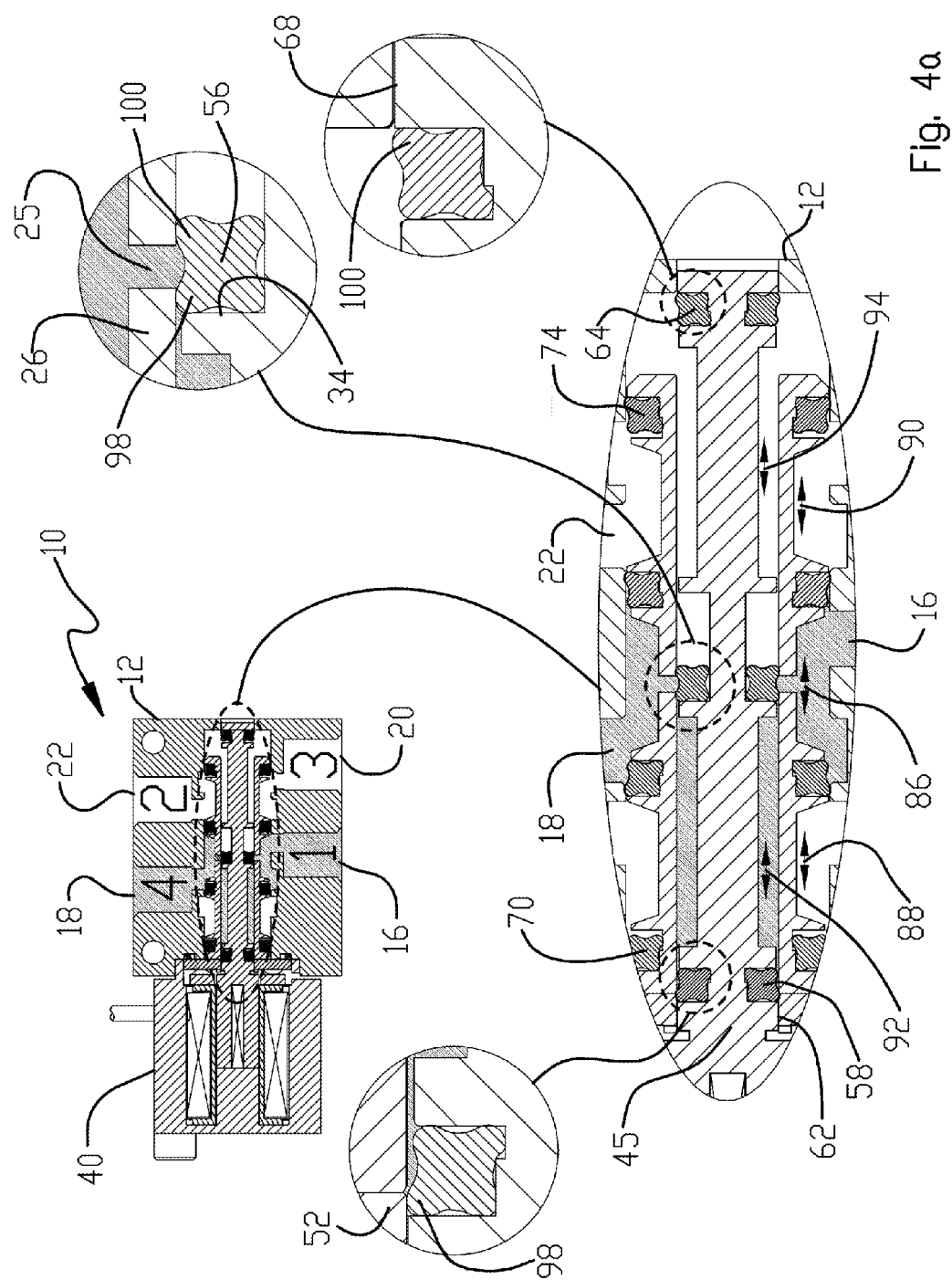
FIG. 4a is a cross sectional view of the valve assembly with the solenoid energized, the spool at the first position prior to shifting, the shuttle seal to the left prior to shifting, and including enlarged views of selected portions of the valve assembly.
Figure 4B:
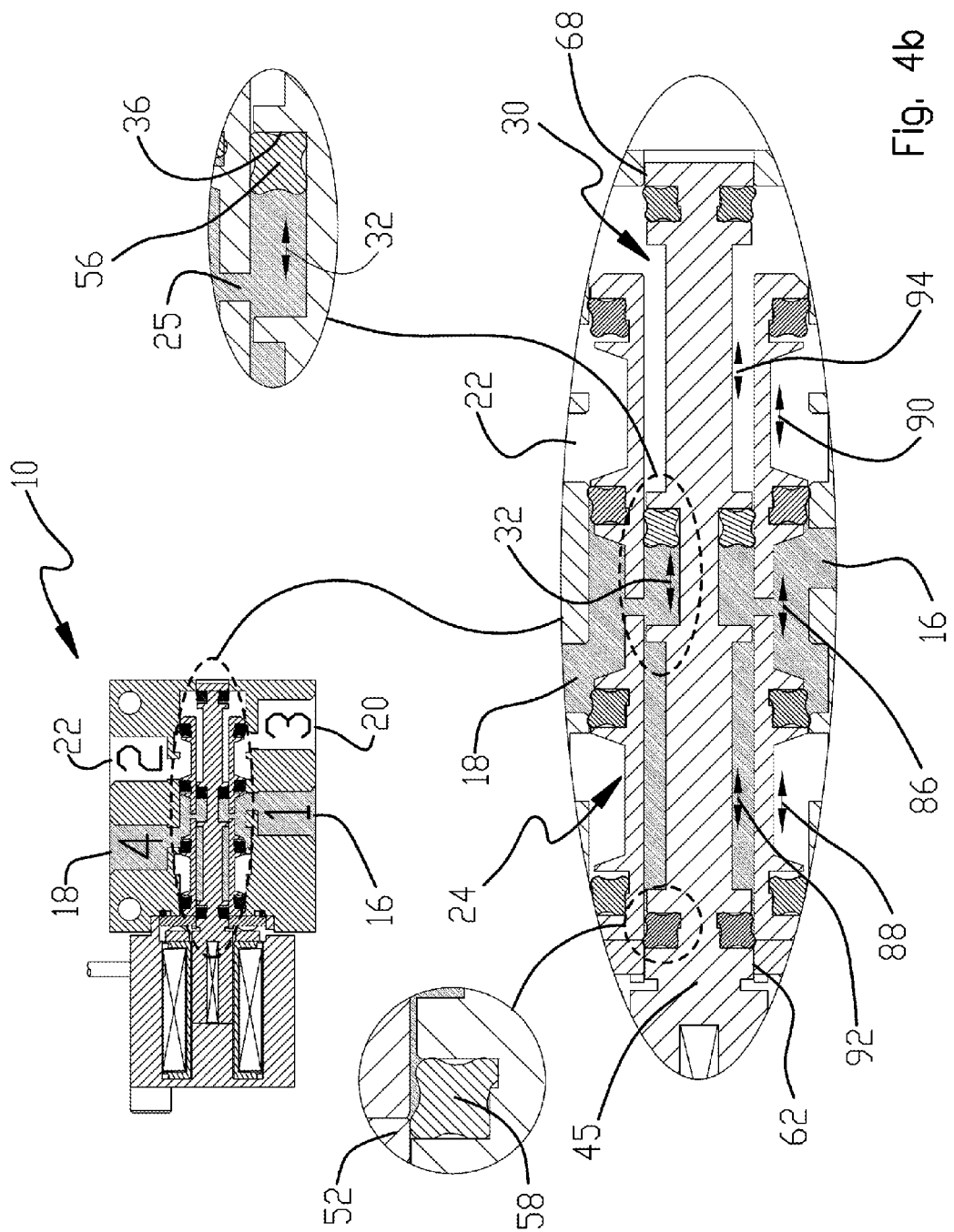
FIG. 4b is a cross sectional view of the valve assembly with the solenoid energized, the spool at the first position prior to shifting, and the shuttle seal fully shifted to the right, and including enlarged views of selected portions of the valve assembly.

FIGS. 4a and 4b show the steps enabling the spool 24 to move from the first operating position shown in FIG. 2a to the second operating position shown in FIG. 3. Referring now to FIG. 4a, when the solenoid 38 is energized, the coil windings 44 create a magnetic field drawing the armature 45 and thus actuator 30 to the left. As a result, lobe 98 of the first actuator end seal 58 disengages its seal to wall of lumen 28 and seals against the body washer 52, and at the same time lobe 100 of second actuator end seal 64 is moved away from the valve body 12 opening a passage around the seal to the second end knurled piloting guide 68 open to atmosphere. This reduction in pressure at the right side of the shuttle seal 56—while maintaining pressure on the left side of the shuttle seal 56—causes lobe 100 of the shuttle seal 56 to seal against the surface of lumen 28. Fluid flowing through the pilot holes 25 thus flows around lobe 98 of the shuttle seal 56 and around the left side of the shuttle seal 56 causing the shuttle seal 56 to move from the first shoulder or end 34 to the second shoulder or end 36 of the shuttle seal channel 32 further opening the pilot holes 25 to fourth annular groove 92 (as shown in FIG. 4b). The pressurized fluid then flows from the fourth annular groove 92 past the first actuator end seal 58 toward the body washer 52 where it forces its way between the body washer 52 and the first end of the spool 24 causing the spool to move fully to the right. As this occurs, the seal 78 closes off the fourth port 18 to the pressurized fluid and opens it to the third or exhaust port 20. Communication between the fourth port 18 and the third port 20 is accomplished by way of through holes in the valve body 12, a design that is common in the industry but not shown in the drawings. Seal 70 always maintains a seal with bore 14. Simultaneously, the first annular groove 86 is brought into communication with the second port 22 and the second intermediate seal 82 closes off the second port 22 from the third or exhaust port 20. The pressurized fluid flows from the first or supply port 16 to the second port 22 by way of the first annular groove 86.

FIG. 3 shows the valve with the solenoid energized (i.e., shifted to the left) and the spool 24 fully shifted to the right in the second operating position. The pressure to the left side of the spool 24 holds the spool 24 to the right in the second operating position. In addition, pressurized fluid entering the pilot holes 25 is also capable of flowing into the annular groove 94, but is prevented from flowing around to the right end of the spool 24 by lobe 100 of second end seal 64.

Figure 5A:
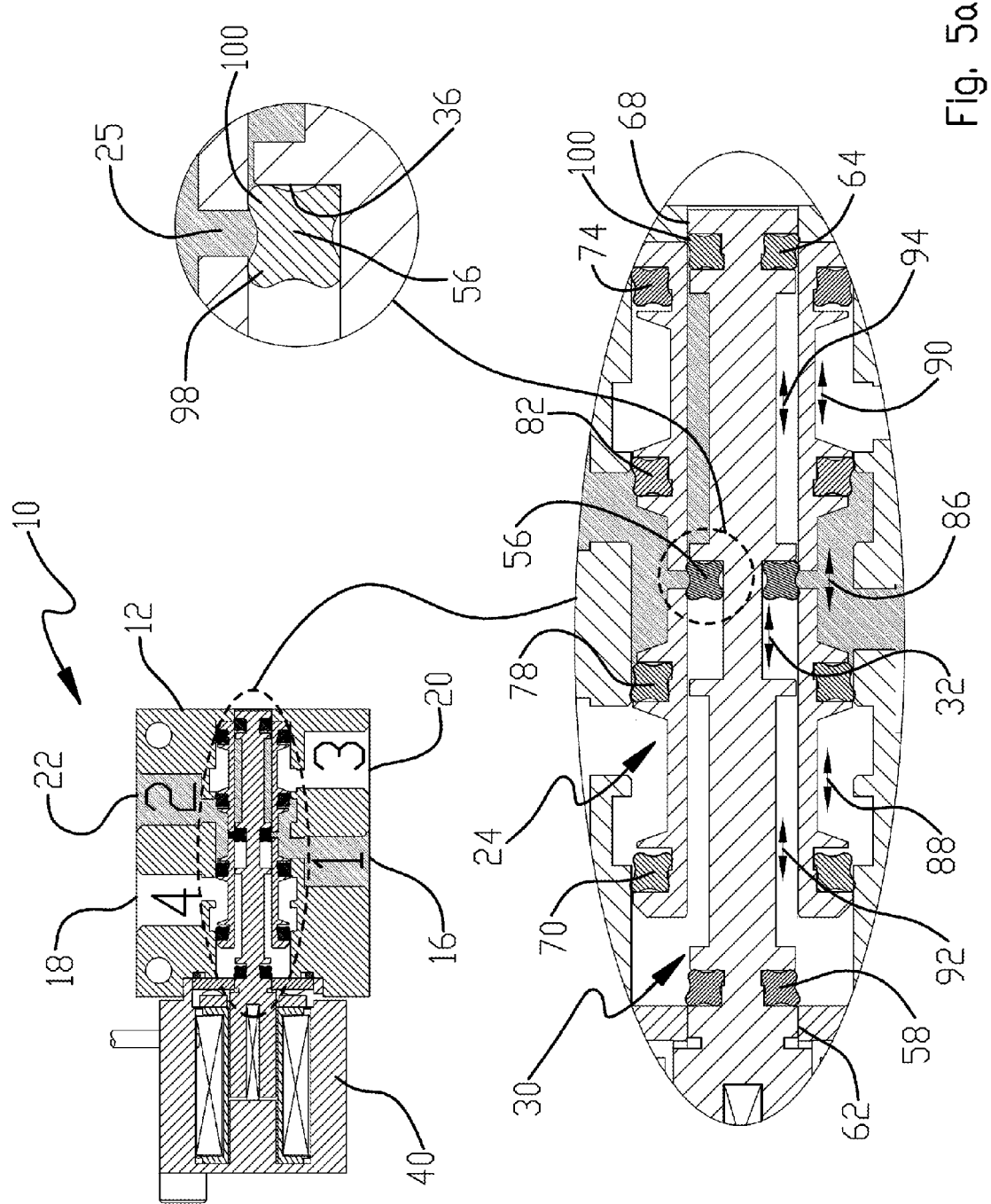
FIG. 5a is a cross sectional view of the valve assembly with the solenoid de-energized, the spool at the second position prior to shifting, and the shuttle seal to the right prior to shifting, and including enlarged views of selected portions of the valve assembly.
Figure 5B:
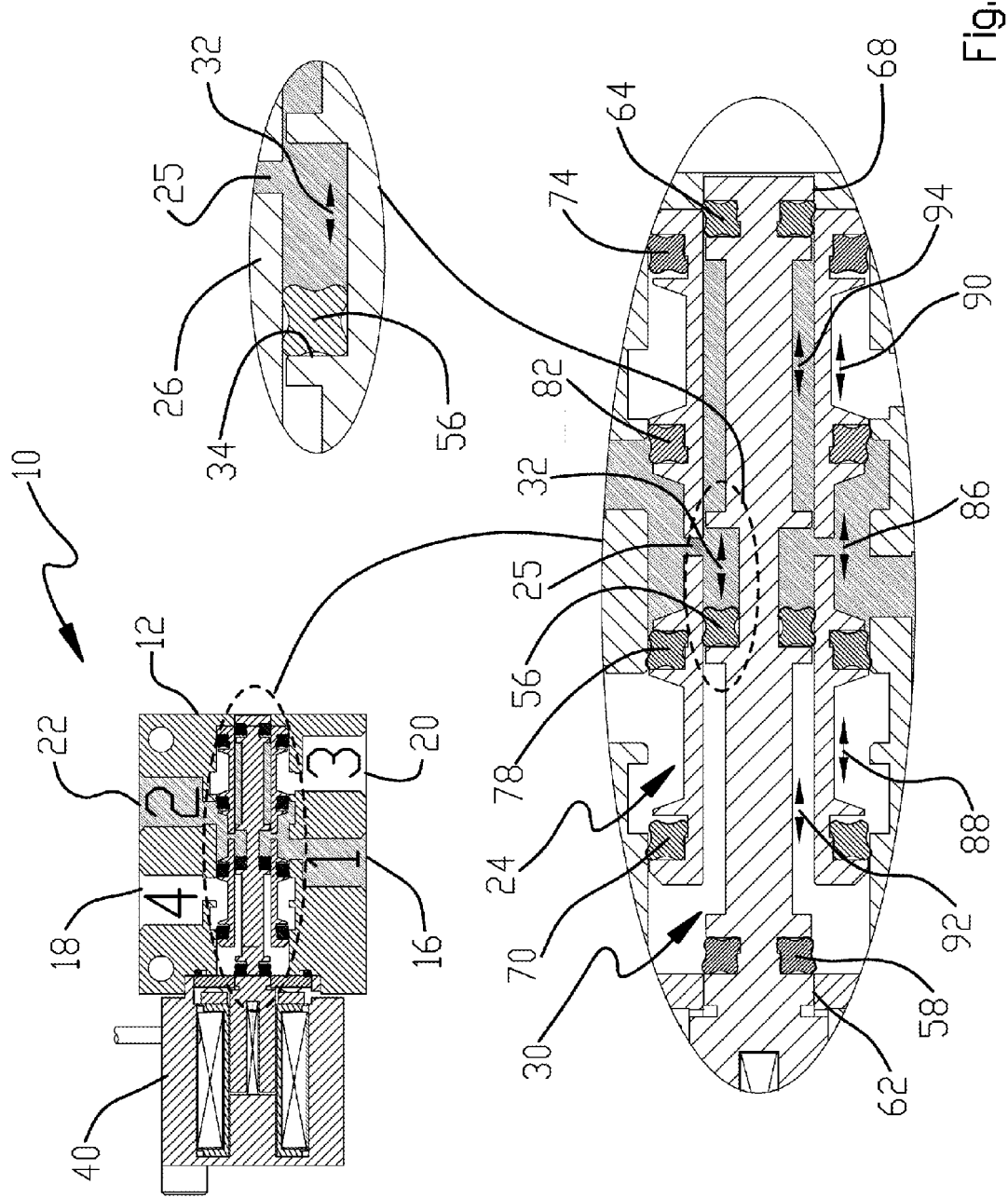
FIG. 5b is a cross sectional view of the valve assembly with the solenoid de-energized, the spool at the second position prior to shifting, and the shuttle seal fully shifted to the left, and including enlarged views of selected portions of the valve assembly.

FIGS. 5a and 5b show the steps enabling the movement of the spool 24 from the second operating position, shown in FIG. 3, back to the first operating position shown in FIG. 2a. When the solenoid 38 is subsequently de-energized, the return spring 47 biases the armature 45/actuator 30 toward the right end of the valve body 12 so that lobe 100 of second actuator end seal 64 disengages its seal at the wall of lumen 28 and seals against the valve body 12 and the first actuator end seal 58 moves away from the body washer 52 opening a passage around the seal 58 to the first end piloting guide 62 open to atmosphere (see FIG. 5a). This pressure change causes lobe 98 of the shuttle seal 56 to seal against the surface of lumen 28 and the pressurized fluid on the right side of the shuttle seal 56 moves the shuttle seal 56 from the second shoulder or end 36 to the first shoulder or end 34 of the shuttle seal channel 32 further opening the pilot holes 25 to the fifth annular groove 94 (see FIG. 5b).

After the transfer of the shuttle seal 56 from the second shoulder 36 to the first shoulder 34, the pressurized fluid then flows from the fifth annular groove 94 past the seal 64 to the end wall of the valve body 12 forcing the spool 24 away from the wall to the left end of the bore 14 (compare FIG. 5b and FIG. 2a). As this occurs, the first annular groove 86 is opened to the fourth port 18 so that pressurized fluid from this first or supply port 16 flows through the first annular groove 86 to the fourth port 18 as shown in FIG. 2a. Simultaneously, the seal 82 seals pressurized fluid off from the second port 22 which is provided in communication with the third or exhaust port 20 through the third annular groove 90.

Reference is made to FIG. 2b, which shows the spool 24 at approximately 0.008 inches away from its second operating position (with the solenoid fully energized). In this position, the annular groove 96 of the shuttle seal 56 is approximately aligned with pilot holes 25 such that lobe 100 of shuttle seal 56 is sealing to wall of lumen 28 and the volume to the right of shuttle seal 56 is open to atmosphere through second end 68. Spool 24 is still moving to its end position to the right and in doing so lobe 100 of actuator end seal 64 enters lumen 28. It should be appreciated that as lobe 100 of end seal 64 is entering lumen 28 there is no fluid pressure in lumen 28 to the left of seal 64. Lobe 100 of seal 64 enters lumen 28 without having to work against the extruding force of the operating pressure.

IV. Alternative Embodiment

The following description is abbreviated, describing the functions that are different from the first embodiment described in detail above.

Figure 6A:
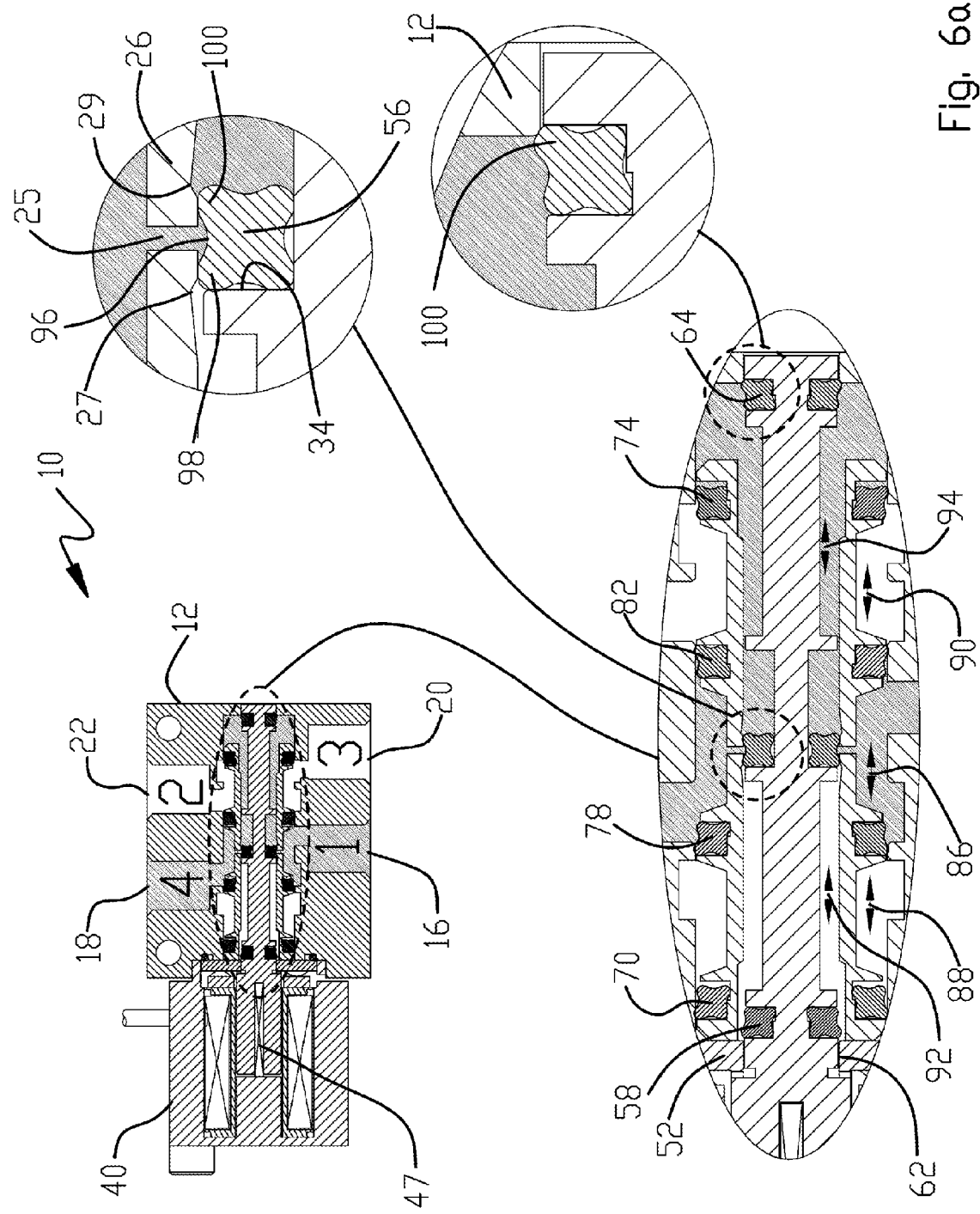
FIG. 6a is a cross sectional view of an alternative embodiment of the valve assembly with the solenoid de-energized, the shuttle seal to the left, and the spool and actuator in the first operating positions, including enlarged views of selected portions of the valve assembly.

Reference is made to FIGS. 1 and 6a. FIG. 6a illustrates an alternative embodiment of the directly piloted valve 10 of the present invention.

In this embodiment, the pilot holes 25 provide fluid communication between the bore 14 in the valve body 12 and the lumen 28 in the spool 24. Radial relief grooves 27, 29 are also provided in the inner surface of the wall 26 on each side of the series of pilot holes 25. The function of these radial relief grooves 27, 29 will be described in detail below.

A shuttle seal 56 is carried on the actuator 30 in the shuttle seal channel 32. The shuttle seal channel 32 may, for example, have a width of between 0.232 inches and about 0.236 inches while the shuttle seal 56 has a width of between 0.057 inches and about 0.063 inches and a ratio of the shuttle seal channel width to the shuttle seal width is between about 3.68 and about 4.14. In this embodiment, the shuttle seal 56 is free to move along the actuator 30 in the shuttle seal channel 32 between the first end or shoulder 34 and the second end or shoulder 36.

When the actuator 30 is properly positioned in the lumen 28 of the spool 24 and the spool 24 is properly positioned in the bore 14 of the valve body 12, the pilot holes 25 provide direct fluid communication between the first annular groove 86 and the bore 14 and the shuttle seal channel 32 in the lumen 28. Typically, each of the pilot holes 25 has a diameter between 0.015 inches and about 0.017 inches. Anywhere from one to ten pilot holes (or more) 25 may be provided at angular intervals about the spool 24 (e.g. two pilot holes, 180 degrees apart, or four pilot holes, one every 90 degrees, or six pilot holes, one every 60 degrees, or ten pilot holes, one every 36 degrees).

As best illustrated in FIG. 6a, each of the seals 56, 58, 64, 70, 74, 78 and 82 includes an annular groove 96 provided between adjacent lobes 98 and 100. As will become apparent in the following description, whether the valve 10 is in the second operating (fully energized, FIG. 6d) position or the first, opposite operating (fully de-energized, FIG. 6a) position, the groove 96 on the shuttle seal 56 is generally aligned with the pilot holes 25.

Figure 6B:
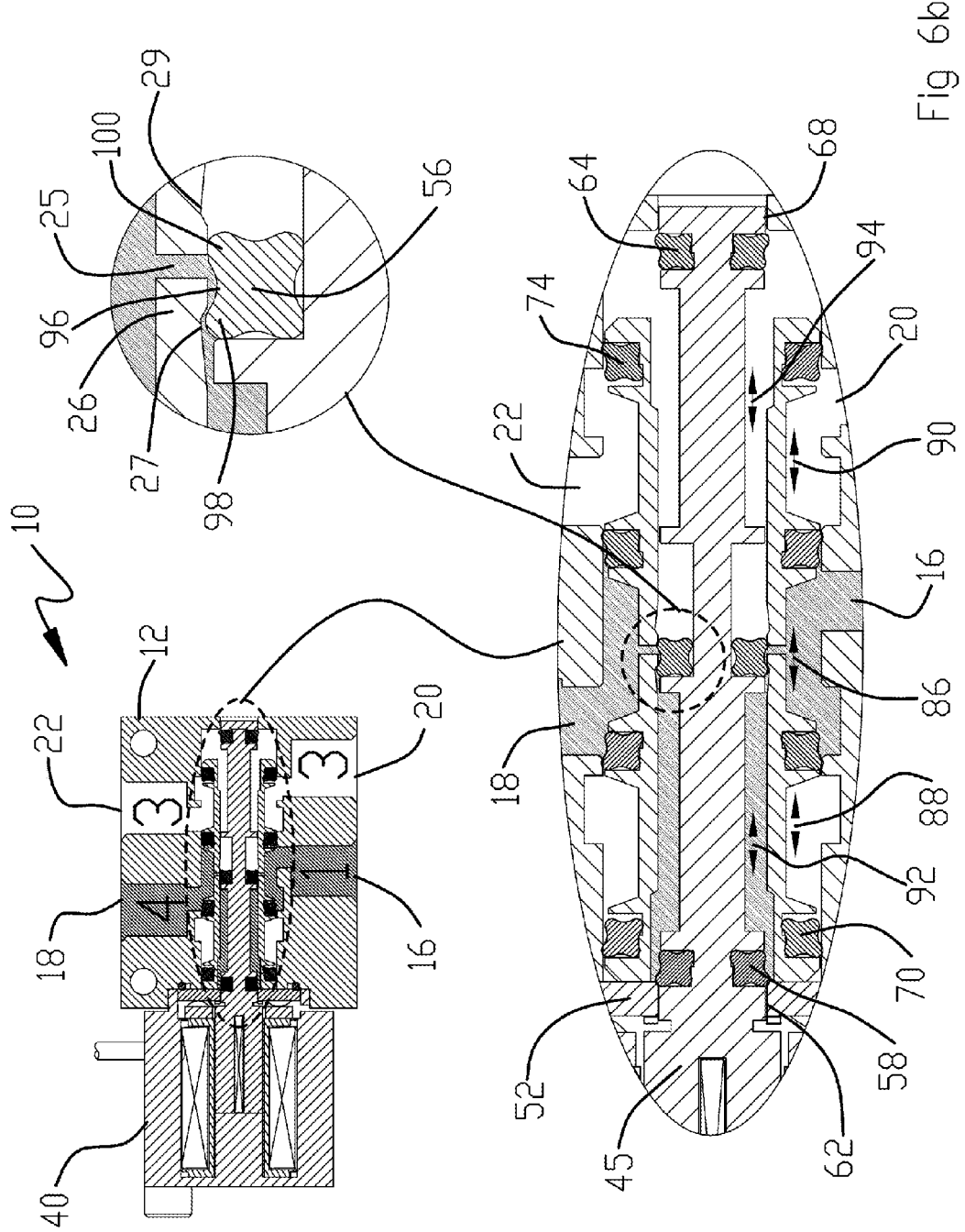
FIG. 6b is a cross sectional view of the valve assembly of FIG. 6a with the solenoid energized, the spool in the first position prior to shifting, and the shuttle seal to the left prior to shifting, and including enlarged views of selected portions of the valve assembly.
Figure 6C:
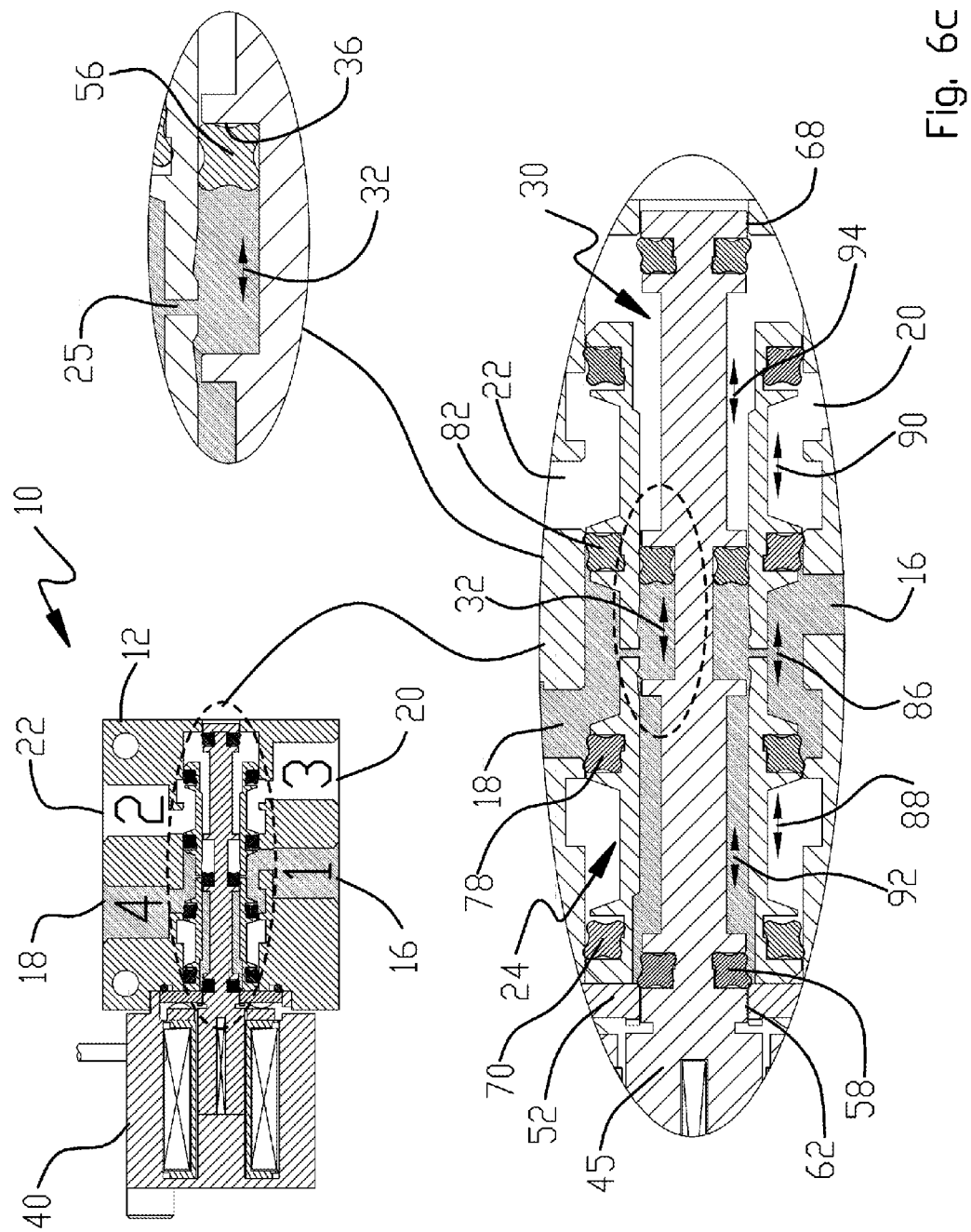
FIG. 6c is a cross sectional view of the valve assembly of FIG. 6a with the solenoid energized, the spool in the first position prior to shifting, and the shuttle seal fully shifted to the right, and including enlarged views of selected portions of the valve assembly.
Figure 6D:
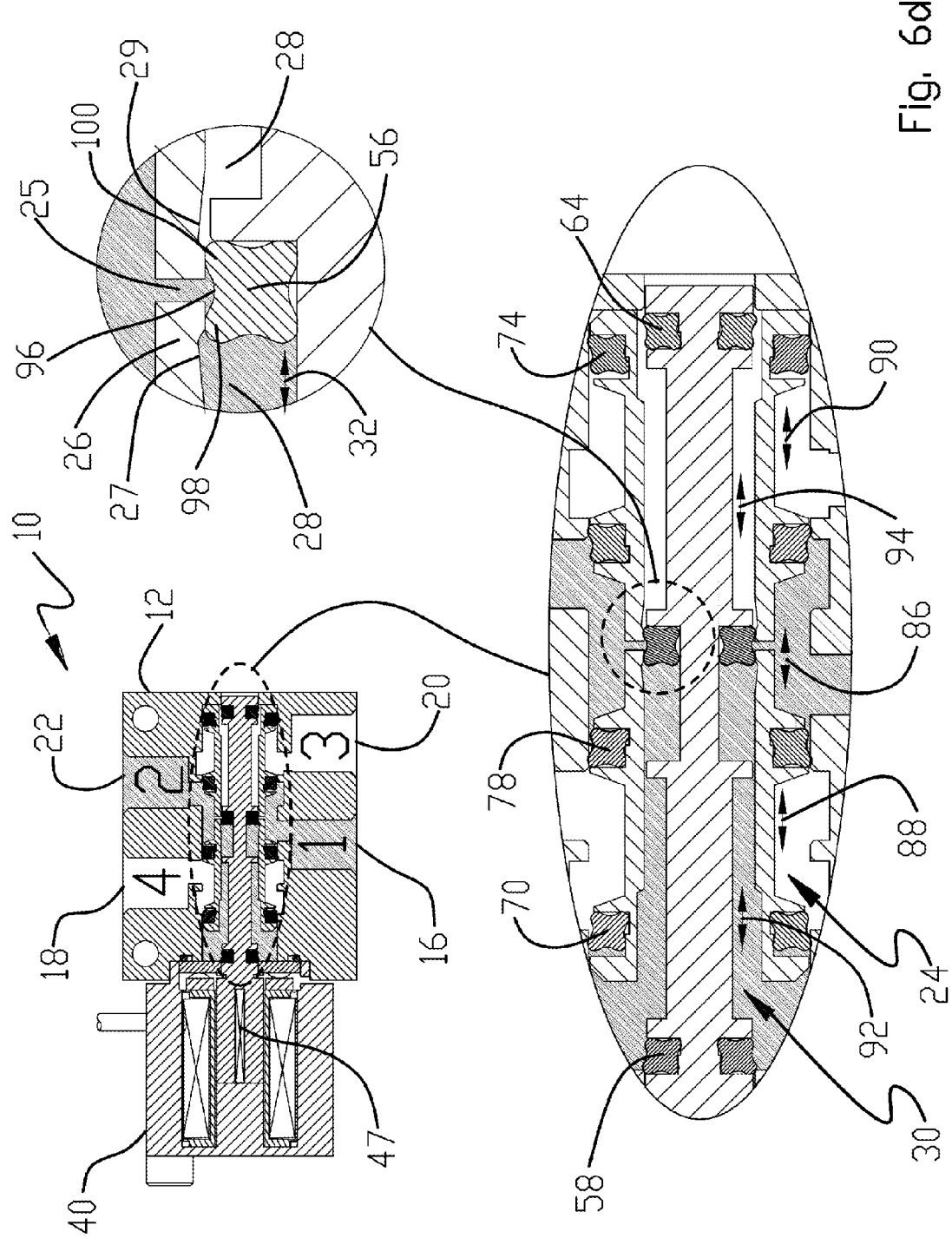
FIG. 6d is a cross sectional view of the valve assembly of FIG. 6a with the solenoid energized, the spool and actuator in the second operating positions, and the shuttle seal to the right, and including enlarged views of selected portions of the valve assembly.

Operation of the valve 10 from the first operating position to the second operating position will now be described in detail with reference to FIGS. 6a, 6b, 6c and 6d. FIG. 6a illustrates the valve 10 in the first or de-energized position. In this position the first or input port 16 is in communication with the fourth or output port 18 while the second port 22 is provided in communication with the third or exhaust port 20. As illustrated in FIGS. 6a and 6b, the shuttle seal 56 is at the first end or shoulder 34 of the shuttle seal channel 32 with the groove 96 of the seal aligned with the pilot holes 25 in FIG. 6a. In FIG. 6b the groove 96 of seal 56 is to the left of pilot holes 25. The actuator 30 is biased to the right in FIG. 6a by operation of the return spring 47 so that the second actuator end seal 64 seals against the valve body 12 while the first end knurled piloting guide 62 is opened to atmosphere so as to provide for its piloting function. As should be appreciated, the pressurized fluid in the bore 14 on the right side of the shuttle seal extends around to the right end of the spool 24 and forces the spool 24 as far as possible to the left thereby opening the fourth port 18 to the pressurized fluid running from port one through the bore 14 while the seals 74, 78 and 82 close off the second port 22 from the supply pressure of the first port 16.

As should further be appreciated from reviewing FIG. 6a, pressurized fluid in the bore 14 also flows through the pilot holes 25 into the annular groove 96 of the shuttle seal 56. Since the volume or space in the bore 14 to the left of the lobe 98 is open to atmosphere by the first end knurled piloting guide 62, the lobe 98 of shuttle seal 56 forms a tight seal against the inner surface of the wall 26 of the lumen 28 and pressurized fluid cannot pass to the left. Since the volume or space in the bore 14 to the right of the lobe 100 of shuttle seal 56 is closed to atmosphere by the second end seal 64 and the volume to the left and to the right of lobe 100 is pressurized at the same pressure, lobe 100 does not seal and the pressurized fluid flows past the lobe 100 at surface of lumen 28 to the right end of the bore 14 where it forces the spool 24 to the left and holds it in position at the left end of the bore 14.

When the solenoid 38 is energized, the coil windings 44 create a magnetic field drawing the armature 45/actuator 30 to the left in the drawing FIG. 6b. As a result, the first actuator end seal 58 seals against the body washer 52, and at the same time the second actuator end seal 64 is moved away from the valve body 12 opening a passage around the seal to the second end knurled piloting guide 68 open to atmosphere. Lobe 98 of shuttle seal 56 moves into relief groove 27 allowing fluid to pass to the left into the fourth annular groove 92. These pressure changes causes lobe 100 of the shuttle seal 56 to seal against the surface of lumen 28 and pressure in the volume to the left of shuttle seal 56 causes the shuttle seal 56 to move from the first shoulder or end 34 to the second shoulder or end 36 of the shuttle seal channel 32 further opening the pilot holes 25 to the fourth annular groove 92 (see FIG. 6c). The pressurized fluid then flows from the fourth annular groove 92 past the first actuator end seal 58 toward the body washer 52 where it forces its way between the body washer and the first end of the spool 24 causing the spool to move fully to the right (compare FIG. 6c and FIG. 6d). As this occurs, the seal 78 closes off the fourth port 18 to the pressurized fluid and opens it to the third or exhaust port 20, seal 70 always maintains a seal with bore 14. Simultaneously, the first annular groove 86 is brought into communication with the second port 22 and the second intermediate seal 82 closes off the second port 22 from the third or exhaust port 20. The pressurized fluid flows from the first or supply port 16 to the second port 22 by way of the first annular groove 86.

Figure 7A:
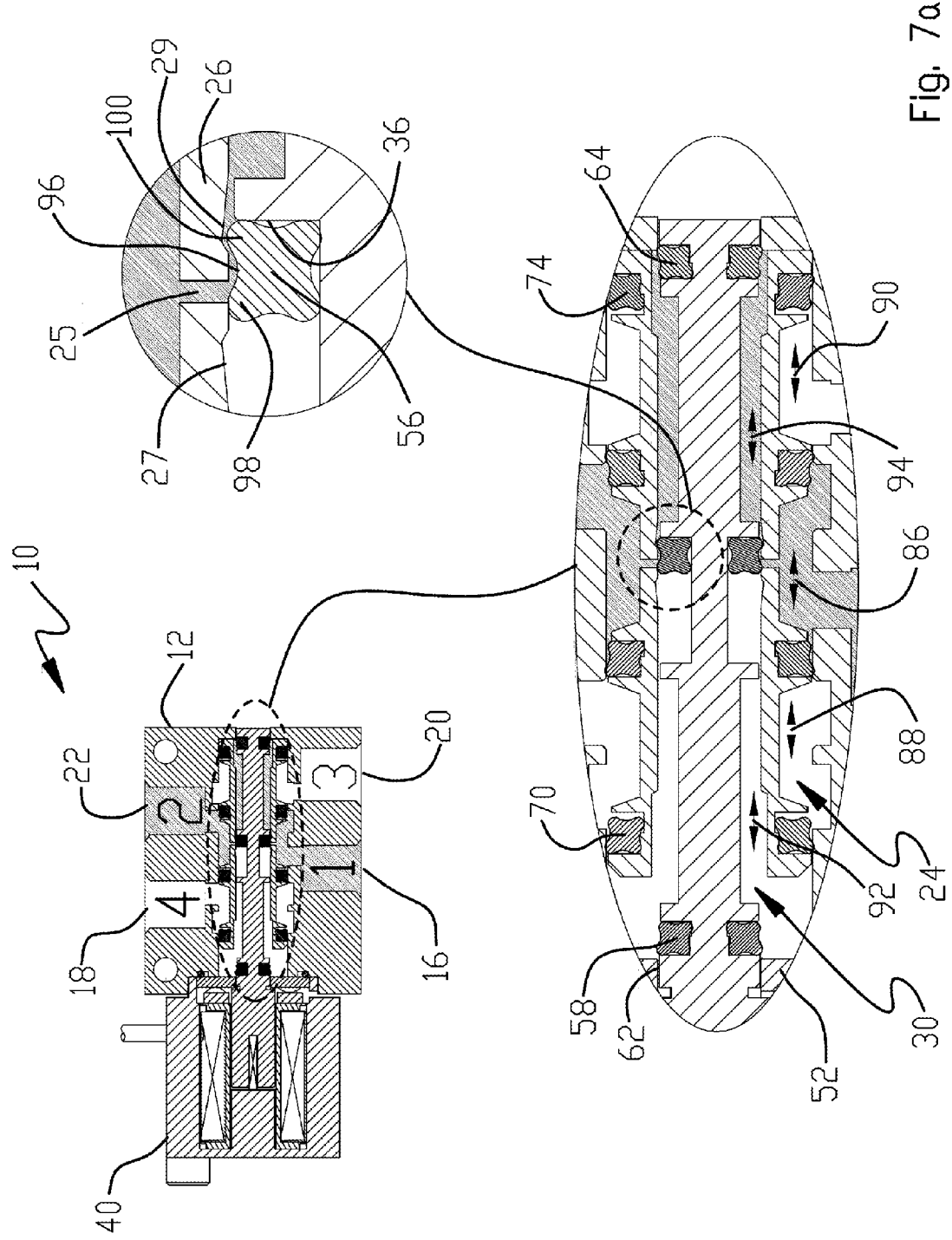
FIG. 7a is a cross sectional view of the valve assembly of FIG. 6a with the solenoid de-energized, the spool in the second position prior to shifting, and the shuttle seal to the right prior to shifting, and including enlarged views of selected portions of the valve assembly.

When the solenoid 38 is subsequently de-energized, the return spring 47 biases the armature 45/actuator 30 toward the right end of the valve body 12 so that the second actuator end seal 64 seals against the valve body 12 and the first actuator end seal 58 moves away from the body washer 52 opening a passage around the seal to the first end piloting guide 62 open to atmosphere (see FIG. 7a). Lobe 100 of shuttle seal 56 moves into relief groove 29 allowing fluid to pass to the right into the fifth annular groove 94. These changes causes lobe 98 of the shuttle seal 56 to seal against the surface of lumen 28 and pressure in the volume to the right of shuttle seal 56 causing the shuttle seal 56 to move from the second shoulder or end 36 to the first shoulder or end 34 of the shuttle seal channel 32 further opening the pilot holes 25 to the fifth annular groove 94 (see FIG. 7b).

Figure 7B:
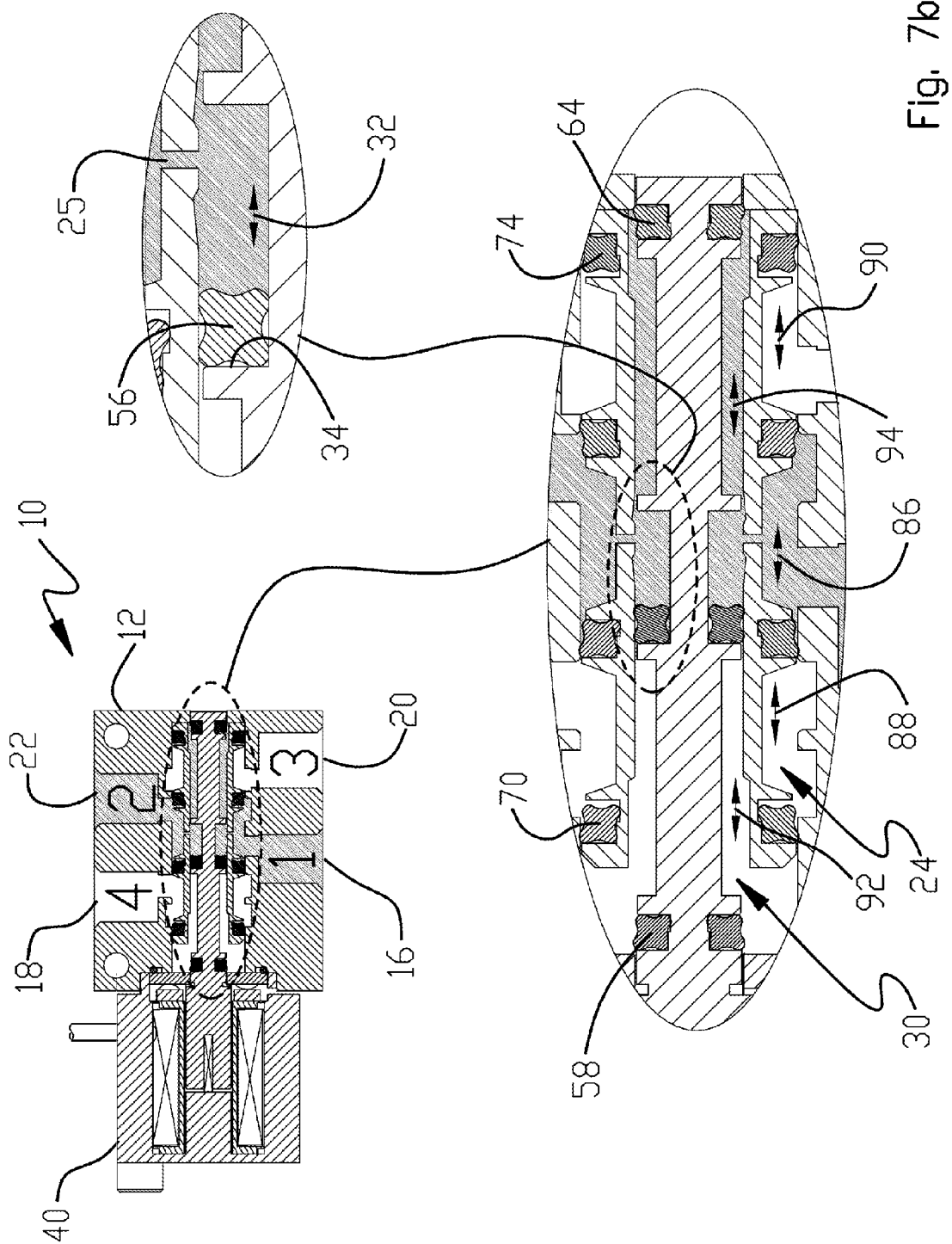
FIG. 7b is a cross sectional view of the valve assembly of FIG. 6a with the solenoid de-energized, the spool in the second position prior to shifting, and the shuttle seal to the left, and including enlarged views of selected portions of the valve assembly.

The pressurized fluid then flows from the fifth annular groove 94 past the seal 64 to the end wall of the valve body 12 forcing the spool 24 away from the wall to the left end of the bore 14 (compare FIG. 7b and FIG. 6a). As this occurs, the first annular groove 86 is opened to the fourth port 18 so that pressurized fluid from this first or supply port 16 flows through the first annular groove 86 to the fourth port 18. Simultaneously, the seal 82 seals pressurized fluid off from the second port 22 which is provided in communication with the third or exhaust port 20 through the third annular groove 90.

Figure 8:
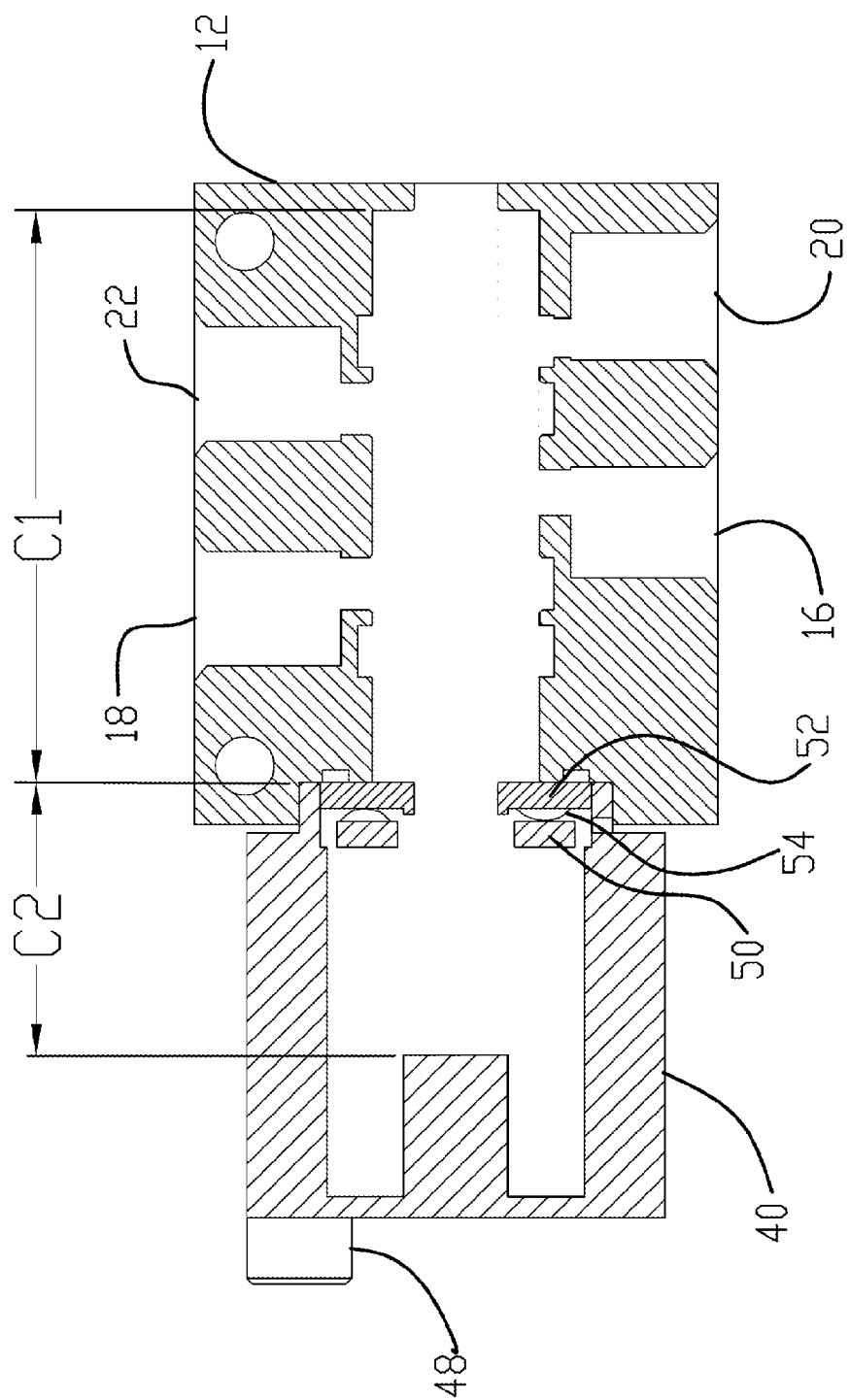
FIG. 8 is a cross sectional view of the valve body and coil holder of the present invention.

As best illustrated in FIG. 8, the valve assembly 10 of the present invention includes two critical dimensions C1 and C2. Critical dimension C1 relates to controlling the spool stroke while critical dimension C2 relates to controlling coil gap and actuator stroke. Both of these features can be machined to tight tolerance because they can be completed with a custom one piece forming tool. Additionally, the three components; body 12, coil holder 40 and body washer 52 are positioned relative to one common surface, thereby eliminating additional variation of spool and armature stroke that would result if additional positioning features were required. The combination of tight machining tolerances and elimination of relative positional tolerances of the critical features ensures optimum performance and product integrity of the valve assembly 10 of the present invention.

Figure 9:
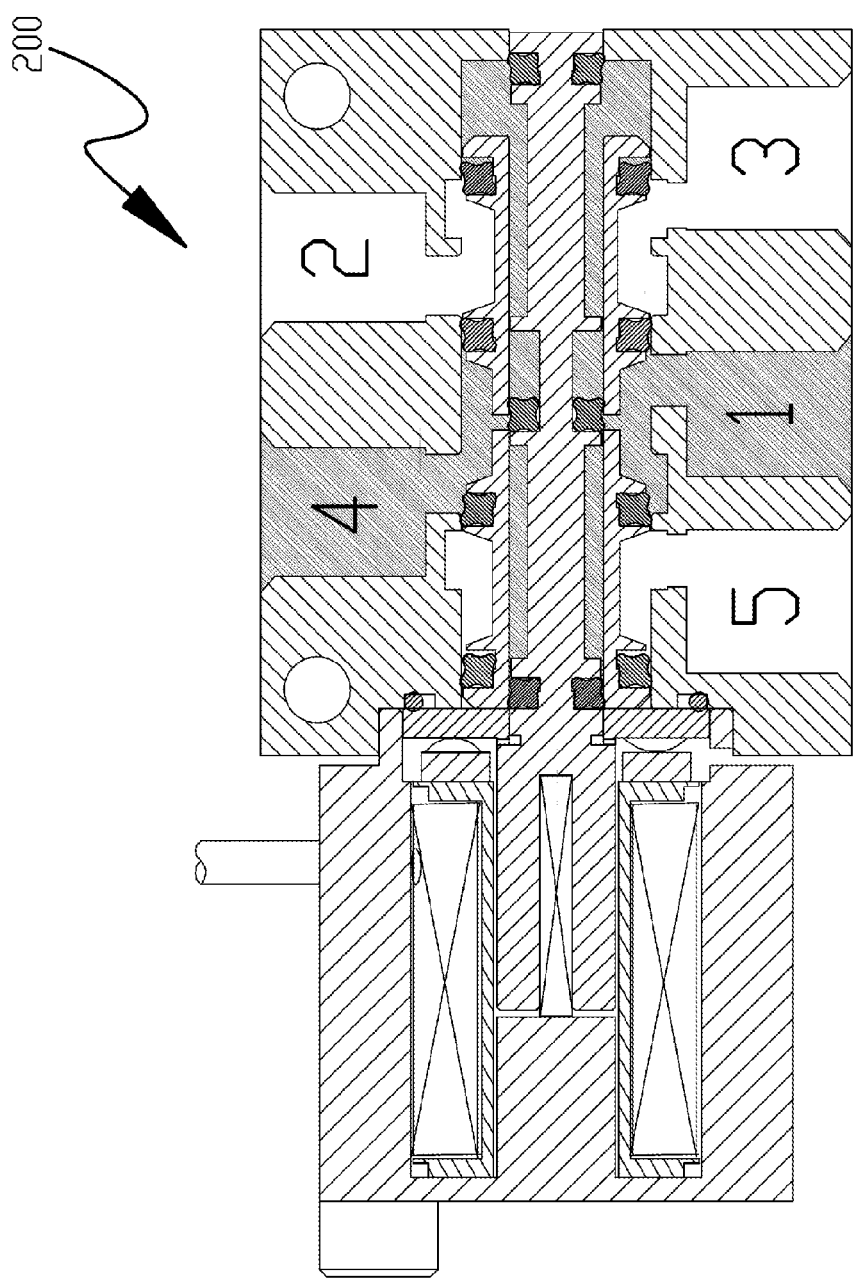
FIG. 9 is a cross sectional view of a four-way, five ported directly piloted valve assembly constructed in accordance with one embodiment of the present invention.

The foregoing descriptions of the current embodiments of the present invention have been presented for purposes of illustration and description. It is not intended to be exhaustive or to limit the invention to the precise form disclosed. Obviously modifications or variations are possible in light of the above teachings. For example, FIG. 9 illustrates a 4-way, 5 ported directly piloted valve constructed in accordance with the teachings of the present invention. FIG. 10 illustrates a 3-way, normally open directly piloted valve constructed in accordance with the teachings of the present invention.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

What is claimed:

1. A directly piloted valve assembly, comprising:
   a valve body including a bore, at least one inlet port, at least one outlet port, and at least one exhaust port wherein said ports are all in fluid communication with said bore;
   a spool received in said bore, said spool including a wall defining a lumen said wall including at least one pilot hole in fluid communication with said lumen and said bore;
   a solenoid actuator received in said lumen, said solenoid actuator including a shuttle seal channel;
   a solenoid connected to said valve body; and
   a shuttle seal received in said shuttle seal channel wherein said spool translates in an actuated direction that is opposite to the actuating direction of the said actuator.

2. The valve assembly of claim 1, wherein said shuttle seal channel has a first width of between about 0.211 inches and about 0.215 inches and said shuttle seal has a second width of between 0.063 inches and about 0.057 inches and a ratio of said first width to said second width is between about 3.35 and about 3.77.

3. The valve assembly of claim 1, wherein said shuttle seal channel has a first width of between about 0.236 and about 0.232 inches and said shuttle seal has a second width of between 0.063 and about 0.057 inches and a ratio of said first width to said second width is between about 3.68 and about 4.14.

4. The valve assembly of claim 1, wherein said solenoid includes a coil and a return spring held in a housing and an armature connected to said actuator.

5. The valve assembly of claim 1, wherein said actuator includes a first actuator end seal held in a first end channel on a first side of said shuttle seal channel and a second actuator end seal held in a second end channel on a second side of said shuttle seal channel.

6. The valve assembly of claim 5, wherein said first and second actuator end seals are quad ring lobed seals with at least a portion of said seals being disposed about said actuator under tension so that an outside diameter of said quad ring lobed seals is enlarged.

7. The valve assembly of claim 1, wherein said actuator has a first stroke having a length L1 and said spool has a second stroke of a length L2 where L2 is greater than L1.

8. The valve assembly of claim 7, wherein a ratio of L2 to L1 is between 12.7 and about 9.1.

9. The valve assembly of claim 1, wherein said shuttle seal translates along said actuator between a first end and a second end of said shuttle seal channel.

10. The valve assembly of claim 9, wherein said shuttle seal channel is positioned relative to said at least one pilot hole.

11. The valve assembly of claim 9, wherein said at least one pilot hole is aligned with said shuttle seal channel.

12. The valve assembly of claim 1, wherein said shuttle seal is a quad ring lobed seal.

13. The valve assembly of claim 12, wherein one lobe of said shuttle seal does not seal pressure when both sides of lobe are at approximately equal pressure.

14. The valve assembly of claim 12, wherein said quad ring lobed seal includes an annular groove, between lobes, aligned with said at least one pilot hole when said spool and said actuator are in a first operating position and a second, opposite operating position.

15. The valve assembly of claim 14, further including two radial relief grooves in said spool wall and communicating with said lumen, one relief groove of said two radial relief grooves being provided on each side of said pilot hole so that said shuttle quad ring lobed seal is also axially centered between said two radial relief grooves when said spool and said actuator are at said first and second operating positions.

16. The valve assembly of claim 12, wherein said quad ring lobed seal is positioned relative to said at least one pilot hole when said spool and said actuator are in a first operating position and when said spool and said actuator are in a second, opposite operating position.

17. The valve assembly of claim 16, including a fourth annular groove on said actuator between said first actuator end seal and said shuttle seal channel and a fifth annular groove on said actuator between said second actuator end seal and said shuttle seal channel.

18. The valve assembly of claim 17, wherein said actuator includes a first end and a second end, and wherein said first and second ends of said actuator include piloting guides that allow air to pass to atmosphere.

19. The valve assembly of claim 1, wherein said spool includes a first spool end seal, a second spool end seal, a first spool intermediate seal and a second spool intermediate seal.

20. The valve assembly of claim 19, wherein said first spool end seal, said second spool end seal, said first spool intermediate seal and said second spool intermediate seal are all quad ring lobed seals.

21. The valve assembly of claim 20, wherein said quad ring lobed seals on said spool are disposed about said spool in tension so as to be pulled toward said center of said spool.

22. The valve assembly of claim 20, wherein at least portions of said quad ring lobed seals on said spool are in tension on said spool such that the two outer lobes are at different diameters.

23. The valve assembly of claim 19, wherein a first annular groove is provided in said spool between said first and second spool intermediate seals, a second annular groove is provided in said spool between said first spool end seal and said first spool intermediate seal and a third annular groove is provided between said second spool end seal and second spool intermediate seal.

24. The valve assembly of claim 23, wherein said at least one pilot hole provides communication between said lumen at said shuttle seal channel and said bore at said first annular groove.

25. The valve assembly of claim 24, wherein said at least one pilot hole has a diameter of between 0.031 and about 0.033.

26. The valve assembly of claim 24, wherein said at least one pilot hole has a diameter of between 0.017 and about 0.015.

27. A directly piloted valve assembly, comprising:
a valve body including a bore, at least one inlet port, at least one outlet port, and at least one exhaust port wherein said ports are all in fluid communication with said bore;
a spool received in said bore, said spool including a wall defining a lumen;
an actuator received in said lumen, said actuator including a shuttle seal channel;
a shuttle seal received in said shuttle seal channel wherein said shuttle seal translates along said actuator between a first end and a second end of said shuttle seal channel; and
a solenoid connected to said valve body;
said wall including at least one pilot hole in fluid communication with said lumen and said bore.

28. The valve assembly of claim 27, wherein said at least one pilot hole is aligned with said shuttle seal channel.

29. The valve assembly of claim 27, wherein said channel has a first width of between about 0.236 and about 0.232 inches and said shuttle seal has a second width of between about 0.063 and about 0.057 inches and a ratio of said first width to said second width is between about 3.68 and about 4.14.

30. The valve assembly of claim 27, wherein said solenoid includes a coil and a return spring held in a housing and an armature connected to said actuator.

31. The valve assembly of claim 27, wherein said actuator has a first stroke having a length L1 and said spool has a second stroke of a length L2 where L2 is greater than L1.

32. The valve assembly of claim 31, wherein a ratio of L2 to L1 is between about 12.7 and about 9.1.

33. A directly piloted valve assembly, comprising:
a valve body including a bore, at least one inlet port, at least one outlet port, and at least one exhaust port wherein said ports are all in fluid communication with said bore;
a spool received in said bore, said spool including a wall defining a lumen;
an actuator received in said lumen, said actuator including a shuttle seal channel;
a shuttle seal received in said shuttle seal channel; and
a solenoid connected to said valve body;
wherein said wall includes at least one pilot hole in fluid communication with said lumen and said bore; and said actuator includes a first actuator end seal held in a first end channel on a first side of said shuttle seal channel and a second actuator end seal held in a second end channel on a second side of said shuttle seal channel.

34. The valve assembly of claim 33, wherein said first and second actuator end seals are quad ring lobed seals assembled under tension so that an outside diameter of said quad ring lobed seals are enlarged.

35. The valve assembly of claim 33, wherein said spool includes a first spool end seal, a second spool end seal, a first spool intermediate seal and a second spool intermediate seal.

36. The valve assembly of claim 35, wherein a first annular groove is provided in said spool between said first and second spool intermediate seals, a second annular groove is provided in said spool between said first spool end seal and said first spool intermediate seal and a third annular groove is provided between said second spool end seal and second spool intermediate seal.

37. The valve assembly of claim 36, wherein said at least one pilot hole provides communication between said lumen at said shuttle seal channel and said bore at said first annular groove.

38. The valve assembly of claim 37 wherein said at least one pilot hole has a diameter of between about 0.017 and about 0.015.

39. A directly piloted valve assembly, comprising:
a valve body including a bore, at least one inlet port, at least one outlet port, and at least one exhaust port wherein said ports are all in fluid communication with said bore;
a spool received in said bore, said spool including a wall defining a lumen;
an actuator received in said lumen, said actuator including a shuttle seal channel;
a shuttle seal received in said shuttle seal channel, said shuttle seal is a quad ring lobed seal; and
a solenoid connected to said valve body;
said wall including at least one pilot hole in fluid communication with said lumen and said bore.

40. The valve assembly of claim 39, wherein said quad ring lobed seal includes an annular groove, between lobes, aligned with said at least one pilot hole when said spool and said actuator are in a first operating position and a second, opposite operating position.

41. The valve assembly of claim 40, further including two radial relief grooves in said actuator wall and communicating with said lumen, one relief groove of said two radial relief grooves being provided on each side of said pilot hole so that said shuttle quad ring lobed seal is also axially centered between said two radial relief grooves when said spool and said actuator are at said first and second operating positions.

42. The valve assembly of claim 39, wherein said first spool end seal, said second spool end seal, said first spool intermediate seal and said second spool intermediate seal are all quad ring lobed seals.

43. The valve assembly of claim 42, wherein said quad ring lobed seals on said spool are in tension on said spool so as to be pulled toward said center of said spool.

44. The valve assembly of claim 42, wherein said quad ring lobed seals on said spool are in tension on said spool such that the two outer lobes are at different diameters.

45. The valve assembly of claim 43, including a fourth annular groove on said actuator between said first actuator end seal and said shuttle seal channel and a fifth annular groove on said actuator between said second actuator end seal and said shuttle seal channel.

46. The valve assembly of claim 45, including piloting guides at two ends of said actuator to allow air to pass to atmosphere.

47. A directly piloted valve assembly, comprising:
a valve body, said valve body defining a bore, an inlet port, at least one outlet port, and an exhaust port, said inlet port, said at least one outlet port and said exhaust port being in fluid communication with said bore;
a spool received in said bore, said spool including a wall defining a lumen, said spool including at least one pilot hole extending through said wall to said lumen, said spool being movable within said bore between a first spool position in which said inlet port is in fluid communication with said outlet port and a second spool position in which said inlet port is not in fluid communication with said outlet port;
an actuator extending through said lumen, said actuator defining a shuttle seal channel;
a solenoid connected to said valve body, said solenoid capable of moving said actuator between a first actuator position and a second actuator position; and
a shuttle seal within said shuttle seal channel, said shuttle seal being movable between a first position at a first end of said shuttle seal channel and a second position at a second end of said shuttle seal channel, wherein said at least one pilot hole is in fluid communication with said shuttle seal channel when said actuator is in said first actuator position and said second actuator position, wherein said at least one pilot hole is in fluid communication with said shuttle seal channel when said spool is in said first spool position and when said spool is in said second spool position.

48. The directly piloted valve assembly of claim 47, wherein said actuator includes a first actuator seal and a second actuator seal, said first actuator seal sealing against said lumen when said spool is in said first spool position, said second actuator seal sealing against said lumen when said spool is in said second spool position.

49. The directly piloted valve assembly of claim 47, wherein said first actuator seal does not seal against said lumen when said spool is in said first position, and wherein said second actuator seal does not seal against said lumen when said spool is in said second spool position.

50. The directly piloted valve assembly of claim 47, wherein said shuttle seal is a quad ring lobed seal.

* * * * *